(12) United States Patent
Kelly et al.

(10) Patent No.: US 10,502,151 B2
(45) Date of Patent: Dec. 10, 2019

(54) METHOD AND SYSTEM FOR PARTICULATE FILTER REGENERATION

(71) Applicant: Ford Global Technologies, LLC, Dearborn, MI (US)

(72) Inventors: Tyler Kelly, Plymouth, MI (US); Douglas Raymond Martin, Canton, MI (US); Julia Helen Buckland, Commerce Township, MI (US); John Eric Rollinger, Troy, MI (US); Benjamin M. Rocci, Plymouth, MI (US); Michiel J. Van Nieuwstadt, Ann Arbor, MI (US); Anil Shah, Canton, MI (US); Emil G. Serban, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 15/660,747

(22) Filed: Jul. 26, 2017

(65) Prior Publication Data

US 2019/0032585 A1 Jan. 31, 2019

(51) Int. Cl.
*F02D 41/02* (2006.01)
*F02D 41/00* (2006.01)
(Continued)

(52) U.S. Cl.
CPC ....... *F02D 41/029* (2013.01); *B01D 46/0063* (2013.01); *F01N 3/0236* (2013.01); *F01N 3/0253* (2013.01); *F01N 3/10* (2013.01); *F01N 3/323* (2013.01); *F01N 9/002* (2013.01); *F01N 11/007* (2013.01); *F02B 37/10* (2013.01); *F02B 37/183* (2013.01); *F02B 39/10* (2013.01); *F02D 37/02* (2013.01); *F02D 41/0007* (2013.01); *F02D 41/008* (2013.01); *F02D 41/0082* (2013.01); *F02D 41/025* (2013.01); *F02D 41/1446* (2013.01); *F02P 5/145* (2013.01);
(Continued)

(58) Field of Classification Search
CPC ............... F02D 41/029; F02D 41/1446; B01D 46/0063; B01D 2279/30; F01N 3/0236; F01N 3/2033; F01N 3/2053; F01N 3/10; F01N 1/14; F01N 3/20; F01N 3/22; F01N 3/36; F01N 3/323; F01N 2610/03; F01N 2900/1804; F01N 11/007; F02B 37/10; F02B 37/183; F02B 39/10; F02P 5/145
USPC ...... 60/602, 608, 611, 605.2, 274, 286, 288, 60/289
See application file for complete search history.

(56) References Cited

U.S. PATENT DOCUMENTS 4,634,887 A * 1/1987 Balch .................... F02D 31/007 290/40 C
7,377,236 B2 5/2008 Reed et al.
(Continued)

*Primary Examiner* — Thai Ba Trieu
(74) *Attorney, Agent, or Firm* — Geoffrey Brumbaugh; McCoy Russell LLP

(57) ABSTRACT

Methods and systems are provided for expediting exhaust particulate filter regeneration. In one example, an engine controller may generate an exotherm at the filter by operating engine cylinders with air-fuel imbalance while using electric assist to a turbocharger to meet a torque demand and raise an intake airflow to enhance the effect of the exotherm. Once heated, the filter may be regenerated by flowing extra air to the exhaust via an air pump and injecting extra fuel to an exhaust passage via an exhaust injector.

20 Claims, 6 Drawing Sheets

(51) Int. Cl.
   *F02B 37/18* (2006.01)
   *F02D 41/12* (2006.01)
   *F02B 39/10* (2006.01)
   *B01D 46/00* (2006.01)
   *F01N 3/023* (2006.01)
   *F01N 3/025* (2006.01)
   *F01N 3/10* (2006.01)
   *F01N 11/00* (2006.01)
   *F02B 37/10* (2006.01)
   *F02D 41/14* (2006.01)
   *F02P 5/145* (2006.01)
   *F01N 3/32* (2006.01)
   *F01N 9/00* (2006.01)
   *F02D 37/02* (2006.01)

(52) U.S. Cl.
   CPC ...... *B01D 2279/30* (2013.01); *F01N 2430/06* (2013.01); *F01N 2900/1602* (2013.01); *F02D 41/123* (2013.01); *F02D 41/1445* (2013.01); *F02D 2200/0802* (2013.01); *F02D 2200/0812* (2013.01)

(56) References Cited

U.S. PATENT DOCUMENTS

| | | | |
|---|---|---|---|
| 7,730,724 B2* | 6/2010 | Shu | F02B 39/16 60/602 |
| 9,394,837 B2 | 7/2016 | Ulrey et al. | |
| 9,759,148 B2* | 9/2017 | Jammoussi | F02D 41/1497 |
| 2005/0109029 A1* | 5/2005 | Busch | F01N 3/22 60/605.1 |
| 2014/0046576 A1* | 2/2014 | Chamarthi | F02D 41/045 701/108 |
| 2015/0240734 A1* | 8/2015 | Chamarthi | F02D 41/045 123/350 |
| 2016/0222898 A1 | 8/2016 | Ulrey et al. | |
| 2017/0159614 A1* | 6/2017 | Miller | F02D 41/144 |
| 2017/0248061 A1 | 8/2017 | Martin et al. | |
| 2018/0149107 A1* | 5/2018 | Morris | F02D 35/027 |
| 2018/0171936 A1* | 6/2018 | McQuillen | F02M 25/0227 |
| 2018/0171937 A1* | 6/2018 | Shelby | F02P 5/152 |
| 2018/0340487 A1* | 11/2018 | Morris | F02D 35/027 |
| 2019/0024552 A1* | 1/2019 | Uhrich | F01N 3/0234 |

* cited by examiner

METHOD AND SYSTEM FOR PARTICULATE FILTER REGENERATION

FIELD

The present description relates generally to methods and systems for enabling particulate filter regeneration.

BACKGROUND/SUMMARY

Direct injection engines may provide increased performance so that engine efficiency may be improved. Directly injecting fuel into a cylinder can reduce temperature in a cylinder so that more air and fuel may be drawn into the cylinder. However, the air-fuel mixture within the cylinder may not be fully vaporized at the time of ignition at higher engine speeds and loads since there is less time to mix air with the fuel. Consequently, a portion of injected fuel may not completely oxidize, thereby forming carbonaceous soot within the cylinder. After the soot is expelled from the engine, the soot may be stored in a particulate filter for subsequent oxidation.

Some internal combustion engines employ a particulate filter or PF (e.g., gasoline particulate filter, GPF, or diesel particulate filter, DPF, based on the engine fueling configuration) in an exhaust system to trap particulate matter flowing through the exhaust system and thereby meet emission standards. However, if the PF is not periodically cleaned or regenerated, the accumulated particulate matter on the PF may cause an increase in the exhaust system backpressure which may further lead to decreased engine performance.

In order to periodically regenerate or purge the PF of particulate matter, measures may be taken to increase the exhaust gas temperature to above a predetermined temperature (e.g., above 600° C.) to incinerate the carbon particles accumulated in the filter. In some cases, PF may reach a high enough exhaust temperature during normal vehicle operation to passively perform a particulate filter regeneration. However, due to the location of the PF in the exhaust system (disposed downstream of an oxidizing catalyst (e.g. three way catalyst)), it may take longer than is desired for temperatures in the exhaust system to reach the PF so that regeneration may be initiated.

One example approach for expediting GPF regeneration is shown by Ulrey et al. in U.S. Pat. No. 9,394,837. Therein, in response to a tip-out condition, particulate filter regeneration may be initiated via ceasing to deliver spark while continuing to supply fuel to one or more cylinders. By ceasing spark delivery, the injected fuel may be ejected from the cylinders into the exhaust system where it may oxidize closer to the particulate filter, increasing the temperature of the particulate filter. Further, the engine air-fuel ratio may be adjusted to vary a state of the exhaust gas mixture entering the particulate filter. Specifically, the air-fuel ratio may be oscillated between a leaner than stoichiometric air-fuel ratio, for generating excess oxygen at the GPF, and a richer than stoichiometric air-fuel ratio, for generating excess fuel to react with the excess oxygen at the GPF.

However, the inventors herein have recognized potential issues with such systems. As one example, the exothermal effect of the air-fuel perturbation may vary based on the amount of air flowing through the engine. For example, more heat may be generated by the air-fuel perturbation at higher airflow conditions as compared to lower airflow conditions. On the other hand, air flow to the engine may be limited by the throttle position which is determined as a function of the operator torque demand. In U.S. Pat. No. 9,394,837, for example, the air-fuel perturbation is performed during a deceleration fuel shut-off condition (DFSO) when operator torque demand and air flow is low. If the air flow is increased to enhance the exotherm, the excess torque may degrade drivability. If the air-fuel perturbation is performed while operator torque demand is elevated, a larger portion of the exhaust heat may be used to drive a turbine to meet the torque demand, resulting in less exhaust heat being available for filter heating. As a result, it may be difficult to balance using exhaust heat for turbine operation with using exhaust heat for particulate filter heating. As another example, relying on the occurrence of a DFSO to regenerate the GPF may limit regeneration opportunities. As a result, the GPF may not be sufficiently or timely regenerated. As yet another example, GPFs tend to be packaged in a location that are slow to heat and not conducive to rapid heating. Spark retard alone may not be sufficient to heat the GPF. In addition, spark retard based approaches may be difficult to isolate to one bank of the engine, especially in engines where one bank has the GPF packaged in a hot location while the other bank has a GPF packaged in a cold location due to packaging constraints.

In one example, the issues described above may be addressed by a method for an engine, comprising: generating an exotherm at an exhaust particulate filter while continuing to provide driver demanded torque by spinning a turbocharger compressor via an electric motor and concurrently operating engine cylinders with cylinder-to-cylinder air-fuel imbalance, the imbalance adjusted to maintain an overall stoichiometric exhaust air-fuel ratio. In this way, particulate filter (e.g., gas particulate filter (GPF)) regeneration initiation may be expedited through rapid heating while meeting operator torque demand.

As one example, responsive to filter regeneration conditions being met (e.g., when particulate filter soot load exceeds a threshold), but the temperature at the filter being insufficient for regeneration, an exotherm may be generated by operating engine cylinders with an air-fuel imbalance while increasing air flow to the engine by spinning a turbocharger compressor using electric assist. By operating the engine with cylinder-to-cylinder air-fuel ratio imbalance, such as with some cylinders operating lean and other cylinders operating rich, an exotherm may be generated near the particulate filter via mixing unburned fuel from the rich burning cylinders with excess oxygen from the lean burning cylinders. At the same time, an overall exhaust air-fuel ratio may be maintained at or around stoichiometry. To further enhance the exothermic effect of the imbalance, a waste-gate valve may be opened so that all the exhaust can be directed to the filter while bypassing a turbocharger turbine. At the same time, the turbocharger compressor may be operated using assistance from an electric motor so that operator torque demand can be met and air flow to the filter can be increased. In addition, any transmission downshifts may be delayed until the particulate filter has been sufficiently heated. If the imbalance is not sufficient to raise the filter temperature, extra air may be delivered to the exhaust passage via use of an exhaust air pump and extra fuel may be delivered to the exhaust passage via use of an exhaust fuel injector. Once the filter temperature is high enough, filter regeneration may be initiated by operating the engine lean. This may include disabling fuel at lower vehicle speeds to regenerate the filter, opportunistically, during a DFSO. Alternatively, at higher vehicle speeds, the engine may be operated leaner than stoichiometry to provide extra oxygen to the exhaust passage while the exhaust injector is used to inject fuel in proportion to the extra oxygen to expedite soot burn-off at the filter.

In this way, particulate filter regeneration may be expedited by maintaining a higher filter temperature. By enhancing the exothermic effect of an air-fuel ratio imbalance using higher air flow provided via a turbocharger compressor, the time required to bring a loaded particulate filter to operating temperature is reduced, without degrading drivability or engine performance. By relying on electric assistance to drive the turbocharger compressor to meet torque demand, the turbocharger may be operated with a waste-gate valve fully open, enabling a larger portion of the heated exhaust to be directed to the filter, while bypassing the turbine. By using an exhaust air pump and fuel injector to generate exhaust heat at the particulate filter, the need for extended lean engine operation is reduced, improving exhaust NOx emissions. By expediting filter heating, filter regeneration can be performed more frequently, improving engine emissions performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
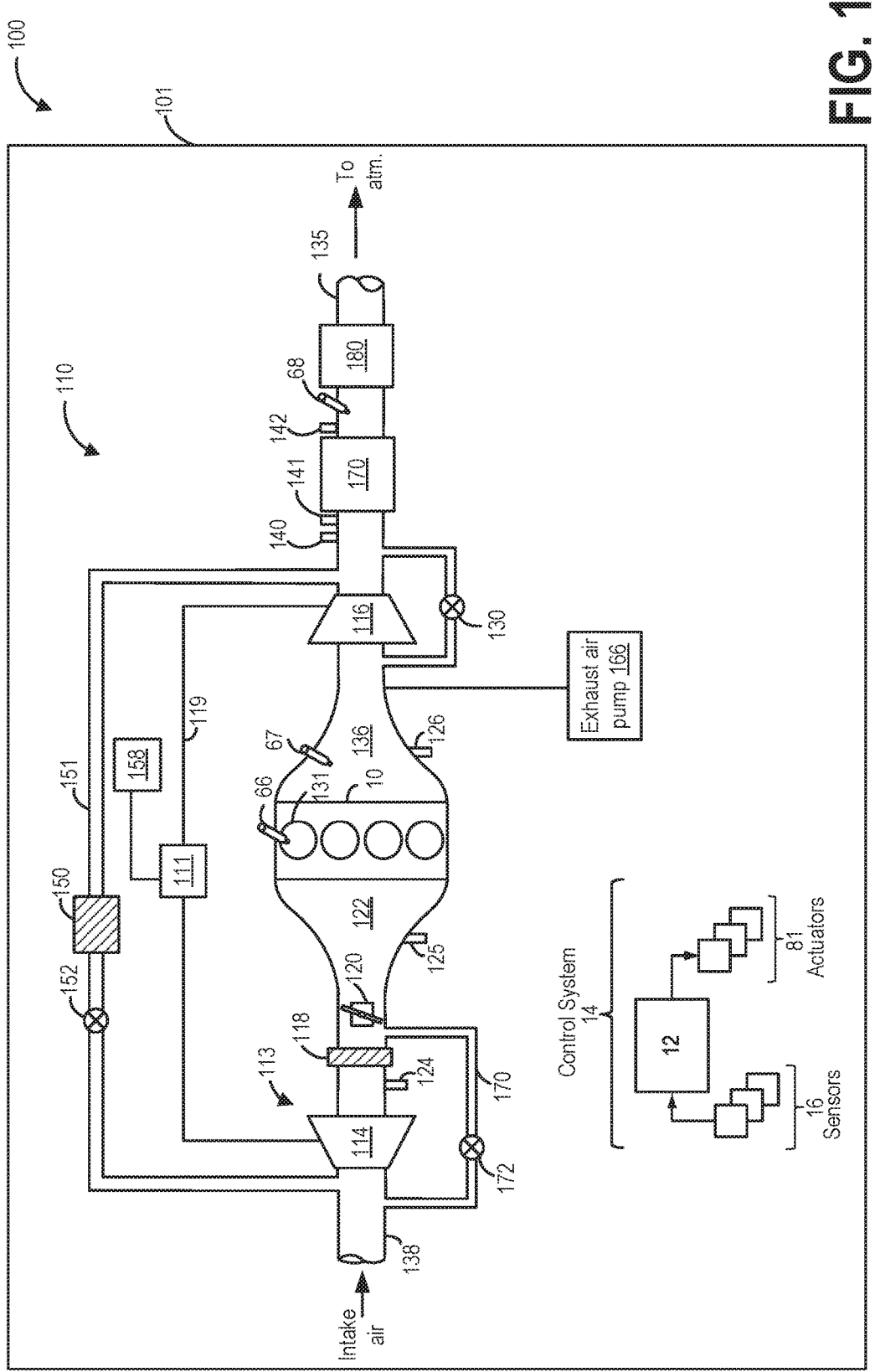
FIG. 1 shows a schematic diagram of a turbocharger and an emission control device system.
Figure 2:
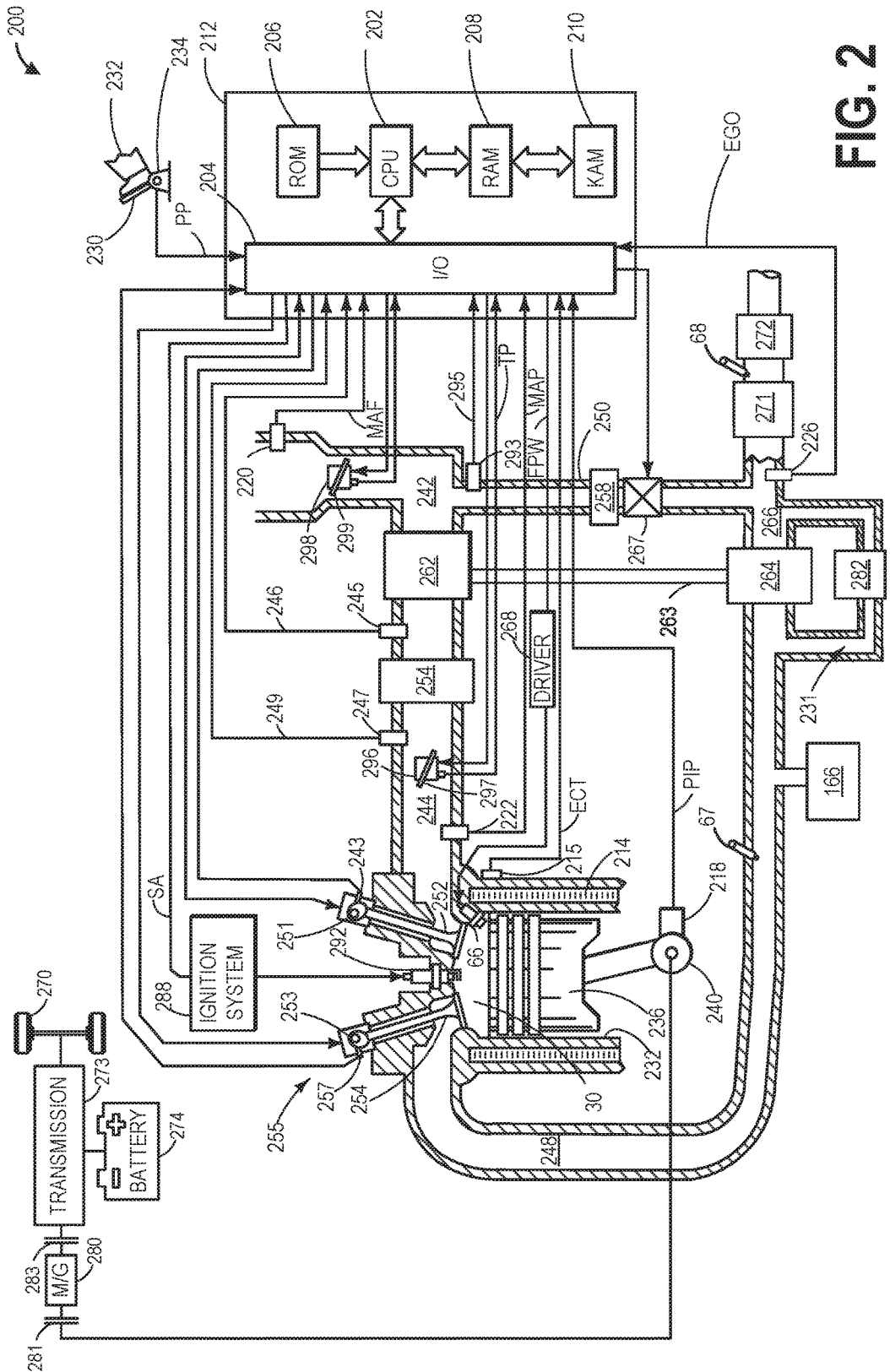
FIG. 2 shows a partial engine view.
Figure 4:
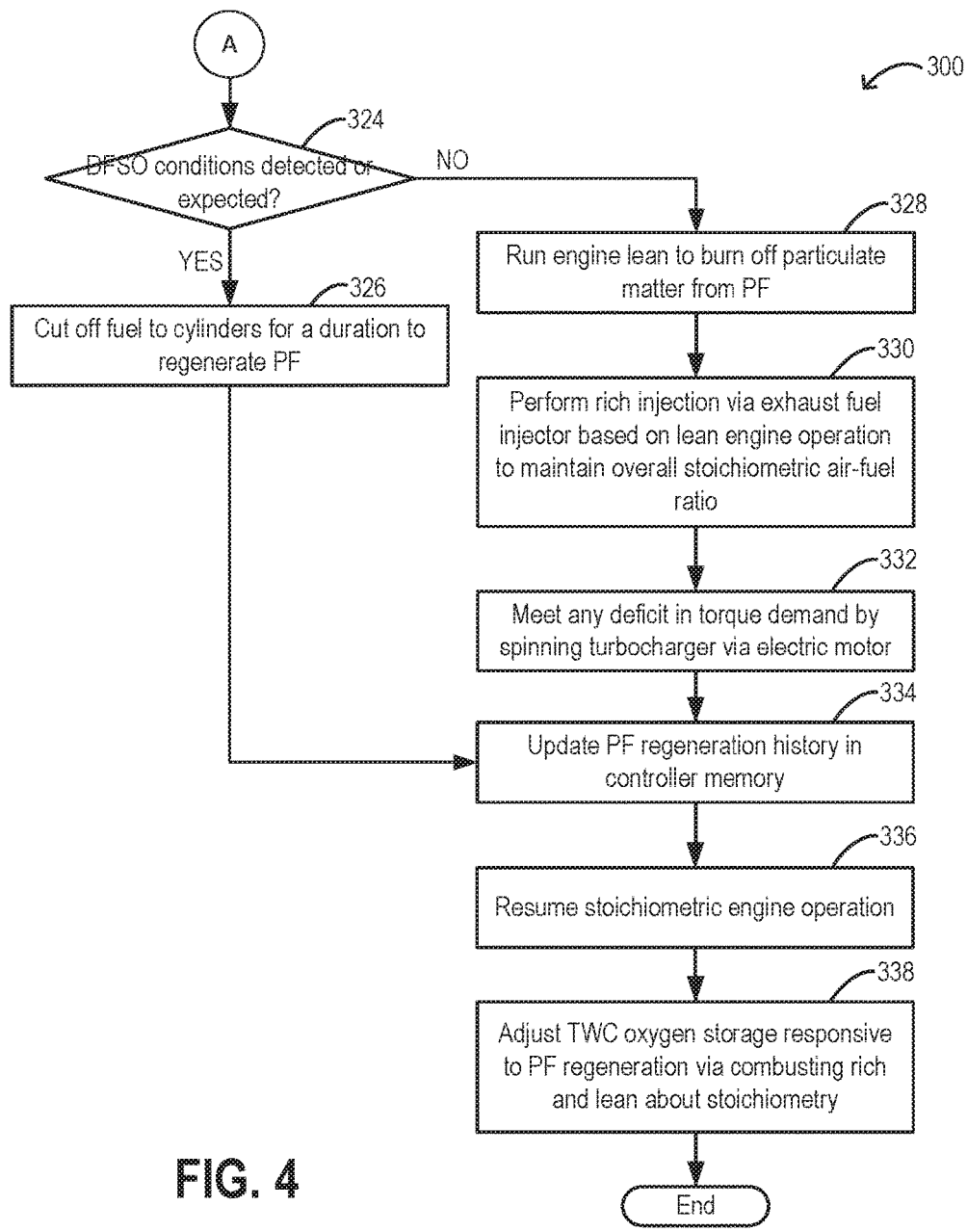
Figure 5:
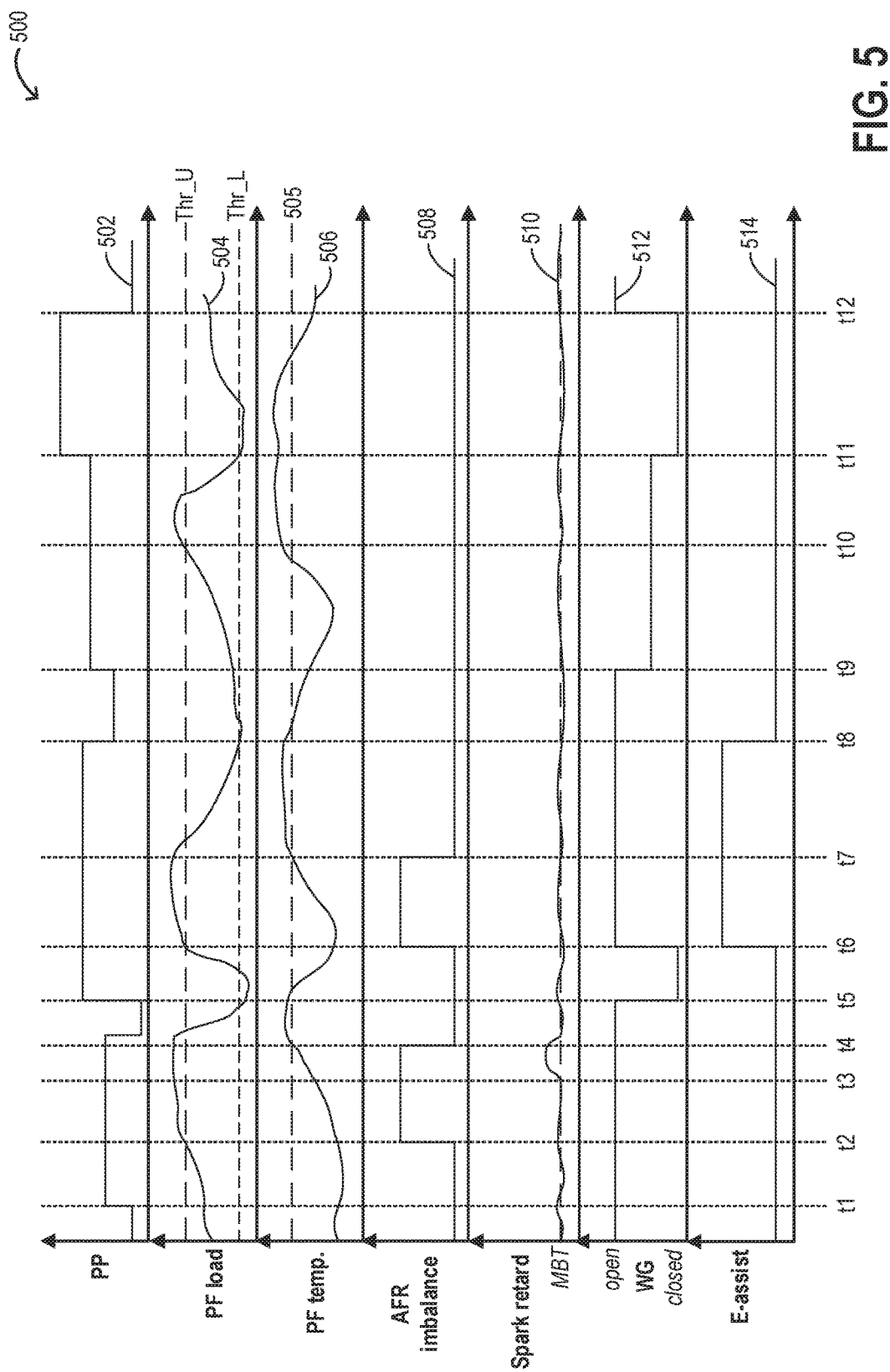
FIGS. 5-6 show an example GPF regeneration initiation process.

The following description relates to systems and methods for rapid heating and frequent regeneration of a gasoline particulate filter (GPF) coupled in a turbocharged engine system configured with electrical assist, such as the engine system of FIGS. 1-2. The engine system may further include an exhaust air pump and an exhaust fuel injector to enable an exhaust air-fuel ratio at the particulate filter to be adjusted distinct from a combustion air-fuel ratio at a cylinder. An engine controller may be configured to perform a control routine, such as the example routines of FIGS. 3-4, to expedite particulate filter heating to an operating temperature where regeneration can be initiated. In particular, the controller may rely on an exotherm generated via a cylinder air-fuel imbalance, the exotherm enhanced using air flow adjustments provided via the turbocharger. A prophetic example of coordinating electric turbocharger operation with cylinder imbalance for filter regeneration is shown at FIG. 5.

Referring now to FIG. 1, a schematic diagram of an engine system 110 comprising multi-cylinder engine 10 is shown. Engine system 110 may be included in a propulsion system 100 of an on-road vehicle 101. Engine 10 may be a boosted engine including a turbocharger 113. Turbocharger 113 includes a compressor 114 driven by a turbine 116. Specifically, fresh air is introduced along intake passage 138 into engine 10 and flows to compressor 114. Compressor 114 is shown mechanically coupled to turbine 116 via a shaft 119, the turbine 116 driven by expanding engine exhaust. In the depicted example, turbocharger 113 is an electric turbocharger further including an electric motor 111 for providing an electric assist to the turbocharger output. In one example, the electric motor may be coupled to shaft 119. However in other examples, the electric motor may be coupled to the compressor or the turbine. By adjusting an output of the electric motor 111, an amount of compressed air delivered by the compressor may be increased, as described below. In one example, the compressor and turbine may be coupled within a twin scroll turbocharger. In another example, the turbocharger may be a variable geometry turbocharger (VGT), where turbine geometry is actively varied as a function of engine speed and other operating conditions.

Compressor 114 is coupled, through charge air cooler (CAC) 118 to throttle valve 120. The CAC may be an air-to-air or air-to-water heat exchanger, for example. Throttle valve 120 is coupled to engine intake manifold 122. From the compressor, the hot compressed air charge enters the inlet of the CAC 118, cools as it travels through the CAC, and then exits to pass through the throttle valve to the intake manifold.

In the embodiment shown in FIG. 1, the pressure of the air charge within the intake manifold is sensed by manifold air pressure (MAP) sensor 125 and a boost pressure is sensed by boost pressure sensor 124 (also referred to as a throttle inlet pressure sensor, or TIP sensor). Compressor recirculation valve 172 is coupled in series between the inlet and the outlet of compressor 114 along compressor bypass 170. Compressor recirculation valve 172 may be a normally closed valve configured to open under selected operating conditions to relieve excess boost pressure. For example, the compressor recirculation valve 172 may be opened during conditions of decreasing engine speed to avert compressor surge. Specifically, to reduce compressor surge, such as on a driver tip-out, boost pressure may be dumped from the intake manifold 122, downstream of CAC 118 and upstream of intake throttle 120, to intake passage 138 by opening compressor recirculation valve 172. By flowing boosted air from upstream of an intake throttle inlet to upstream of the compressor inlet, boost pressure may be rapidly reduced, expediting boost control. Compressor recirculation valve 172 may be an on-off valve or a continuously variable valve whose position can be adjusted to a fully open position, a fully closed position, or any position there-between.

Intake manifold 122 may be coupled to a series of combustion chambers 131 through a series of intake valves (not shown). Combustion chambers 131 may be supplied one or more fuels, such as gasoline, alcohol fuel blends, diesel, biodiesel, compressed natural gas, etc. Fuel may be supplied to the combustion chambers via fuel injector 66. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

The combustion chambers 131 may be further coupled to exhaust manifold 136 via a series of exhaust valves (not shown). In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116 for estimating an exhaust air-fuel ratio. Alternatively, a two-state exhaust gas oxygen sensor may be substituted for UEGO sensor 126. It is understood that sensor 126 may also be any other suitable sensor for providing an indication of exhaust gas air-fuel ratio in the exhaust system.

Engine 10 may include an exhaust gas recirculation (EGR) system to help lower NOx and other emissions. For example, engine 10 may include a low pressure EGR (LP-EGR) system including a low pressure EGR passage 151 in fluid communication with exhaust manifold at a location downstream of exhaust turbine 116, and in fluid communication with intake manifold 122 at a location upstream of intake compressor 114. By adjusting the opening of EGR valve 152 located in LP-EGR passage 151, a portion of exhaust may be diverted from the exhaust manifold to the intake manifold. The heated exhaust may be cooled upon passage through EGR cooler 150 before being recirculated to the intake passage.

Exhaust from the one or more exhaust manifold sections is directed to turbine 116 to drive the turbine. When reduced turbine torque is desired, such as responsive to a tip-out, at least some exhaust may be directed instead through waste-gate passage 231 including waste-gate valve 130, bypassing the turbine. Additionally, during conditions when expedited heating of a downstream particulate filter is desired, the waste-gate valve 130 may be opened so that hot exhaust may be directed to the filter, while bypassing the turbine.

As described earlier, turbocharger 113 may be configured to receive electric assistance from electric motor 111. Electric motor 111 may be configured as a motor/generator. Electric motor 111 may be coupled to an energy storage device, such as a battery 158. Based on operating conditions, electric motor 111 may be operated as a motor (motor mode) using electrical power drawn from battery 158 to provide positive motor torque to turbocharger shaft 119. Alternatively, the electric motor may be operated as a generator (generator mode) to provide negative motor torque to turbocharger shaft 119 and charge battery 158. The electric motor may be operated in the motor mode (also referred to herein as electric assist) for providing additional torque to meet an increase in torque demand while the turbine spins up, such as during a tip-in. The electric motor may be operated in the generator mode for rapidly spinning down the turbocharger and reducing turbocharger output while storing electrical energy responsive to a decrease in torque demand, such as during a tip-out.

The combined exhaust flow from the turbine and the waste-gate then flows through an emission control device comprising an upstream gas particulate filter (GPF) 170 and a downstream exhaust after-treatment device 180. GPF 170 temporarily filters and stored particulate matters or soot (PMs) from exhaust gases in order to lower emissions. The GPF may be manufactured from a variety of materials including cordierite, silicon carbide, and other high temperature oxide ceramics. In one example, the GPF may be a catalyzed particulate filter containing a washcoat of precious metal, such as platinum, to lower soot combustion temperatures and also to oxidize hydrocarbons and carbon monoxide to carbon dioxide and water. The GPF may be periodically regenerated to burn off the accumulated soot, such as when the soot load on the GPF is higher than a threshold load. Therein extra air may be directed to a heated GPF to oxidize the retained particulates. Exhaust after-treatment device 180 may be configured to catalytically treat the exhaust flow to reduce an amount of one or more substances in the exhaust flow. In one example, exhaust after-treatment catalyst 180 may be a three-way catalyst (TWC). All or part of the filtered and treated exhaust from GPF 170 and exhaust after-treatment device 180, respectively, may be released into the atmosphere via exhaust conduit 135.

The GPF regeneration process may be performed to reduce the soot load retained in the GPF. Once soot accumulation has reached a predetermined level, identified via a pressure drop, for example, regeneration of the filter may be initiated. In one example, the pressure drop may be determined based on the comparison of an output of an upstream pressure sensor 141 relative to a downstream pressure sensor 142 across the particulate filter. In alternate examples, soot accumulation may be modeled based on engine operating conditions including engine speed and load, such as by referencing a look-up table or algorithm stored in the controller's memory. In addition, based on engine operating conditions such as periods of engine operation with fuel enrichment, cold-starts, DFSO events, etc., the accumulated soot load may be estimated and tracked. Once the accumulated soot (or soot load) exceeds a threshold, a regeneration routine (described further in FIG. 3) may be initiated.

Engine system 100 may include one or more temperature and pressure sensors, such as temperature sensor 140 positioned immediately downstream of exhaust turbine 116 along exhaust conduit 135. Temperature sensor 140 may be used to estimate a temperature of GPF 170. In one example, the GPF temperature may be compared to a threshold when the GPF is fully loaded to determine if regeneration can be initiated. Pressure sensors 141 and 142 may be positioned upstream and downstream of GPF to measure a differential pressure across GPF 170. In one example, the differential pressure across the GPF may be used to infer the soot load of the GPF.

Engine system 100 may further include one or more exhaust fuel injectors. For example, a first exhaust fuel injector 67 may be coupled upstream of turbine 114 and a second exhaust fuel injector 68 may be positioned downstream of GPF 170 and upstream of exhaust after-treatment device 180. In one example, first exhaust fuel injector 67 may be operated to perform a rich fuel injection at the exhaust while operating the engine lean in order to maintain an overall stoichiometric exhaust air-fuel ratio. In particular, extra fuel introduced into the exhaust passage by exhaust fuel injector 67 may be combusted with the extra air introduced via the lean engine operation at the exhaust manifold 136, causing additional heat to be generated at or around the particulate filter (PF). Additionally or optionally, extra air may be introduced into the exhaust passage by exhaust air pump 166. By increasing the PF temperature, regeneration conditions may be expedited. By having exhaust fuel injector 67 upstream of the turbine, an exhaust air-fuel ratio at the particulate filter may be adjusted independently from the combustion air-fuel ratio at engine cylinders. In this way, the air-fuel ratio (AFR) upstream of the turbine may be adjusted in an accurate manner to aid regeneration of the particulate filter without disturbing the combustion process in the cylinder.

Post-GPF exhaust fuel injector 68 may be used to adjust the exhaust air-fuel ratio at the exhaust after-treatment device 180. For example, the catalytic converting efficiency of the device may be maintained by maintaining the exhaust air-fuel ratio at the exhaust catalyst at or around stoichiometry. In addition, responsive to oxygen break-through at the exhaust catalyst, such as during heating of a particulate filter, fuel may be supplied by post-GPF fuel injector 68 to the exhaust after-treatment device 180 to activate the catalyst.

Figure 3:
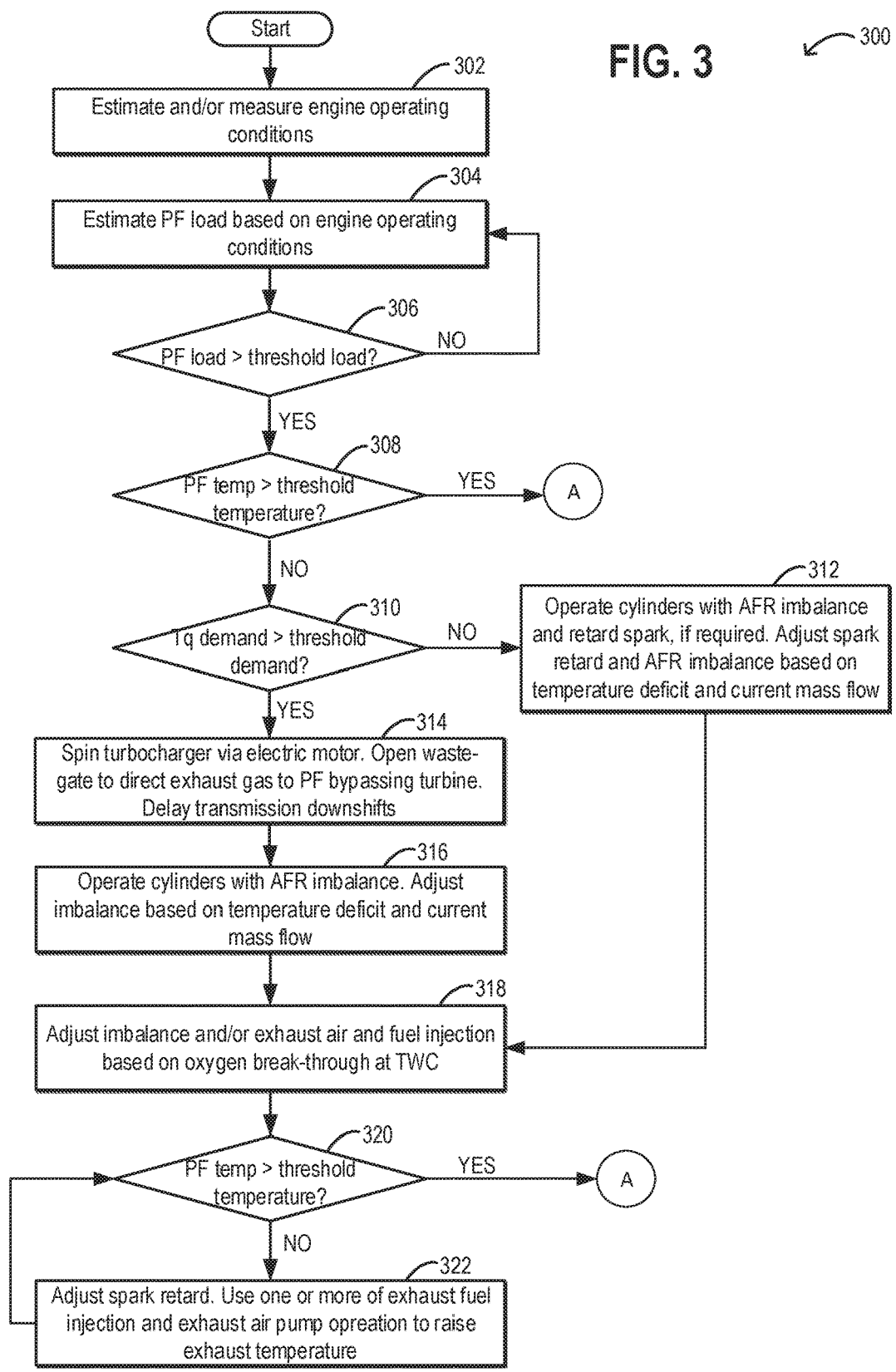
FIGS. 3-4 shows example flowcharts illustrating a high level routine for rapid heating of particulate filter (PF) to initiate PF regeneration.

As elaborated with reference to FIG. 3, particulate filter regeneration may be initiated by heating the filter responsive to soot load at the filter being higher than a threshold load. The filter may be heated to or above a temperature that enables soot particles to be burned at a faster rate than the deposition of new soot particles, for example, to 400-600° C. In one example, filter heating is expedited by operating the engine with cylinder-to-cylinder air-fuel ratio imbalance. In addition, spark timing may be retarded. Further still, the exhaust fuel injector and the exhaust air pump may be operated to generate additional exhaust heat.

Once the filter has been sufficiently warmed up, soot burn up may be expedited by flowing extra air through the filter. For example, exhaust entering GPF 170 may be enleaned by operating the engine with a leaner than stoichiometric air-fuel ratio. In another example, while operating the engine at stoichiometry, exhaust air pump 166 may be operated to increase air flow into the exhaust passage resulting in oxygen rich air being introduced at the inlet of GPF 170.

Engine system 110 may further include control system 14. Control system 14 is shown receiving information from a plurality of sensors 16 (various examples of which will be described in FIG. 2) and sending control signals to a plurality of actuators 81 (various examples of which will be described in FIG. 2). As one example, sensors 16 may include UEGO sensor 126 configured to estimate an exhaust gas air-fuel ratio in the exhaust passage, temperature sensor 140 for estimating a temperature of the GPF, boost or throttle inlet pressure sensor 124 for estimating a boosted output of the compressor, pressure sensors 141 and 142 for estimating soot load at the GPF, etc. Other sensors such as additional pressure, temperature, air/fuel ratio, exhaust flow rate and composition sensors may be coupled to various locations in the vehicle system 100. As another example, actuators 81 may include fuel injectors 66, 67, and 68, throttle 120, exhaust air pump 166, etc.

FIG. 2 depicts an example embodiment of a combustion chamber or cylinder of internal combustion engine 10, such as engine 10 of FIG. 1. Engine 10 may be controlled at least partially by a control system including controller 212 (similar to controller 12 of FIG. 1) and by input from a vehicle operator 232 via an input device 230. In this example, input device 230 includes an accelerator pedal and a pedal position sensor 234 for generating a proportional pedal position signal PP. Combustion chamber (i.e., cylinder) 30 (similar to combustion chamber 131 of FIG. 1) of engine 10 may include combustion chamber walls 232 with piston 236 positioned therein. In some embodiments, the face of piston 236 inside cylinder 30 may have a bowl. Piston 36 may be coupled to crankshaft 40 so that reciprocating motion of the piston is translated into rotational motion of the crankshaft. Crankshaft 240 may be coupled to at least one drive wheel of a vehicle via an intermediate transmission system. Further, a starter motor may be coupled to crankshaft 240 via a flywheel to enable a starting operation of engine 10.

In some examples, engine system 200 may be a hybrid vehicle engine system with multiple sources of torque available to one or more vehicle wheels 270. In other examples, engine system 200 may be a conventional vehicle engine system with only an engine, or an electric vehicle engine system with only electric machine(s). In the example shown, engine system 200 may include engine 10 and an electric machine 280. Electric machine 280 may be a motor or a motor/generator. Crankshaft 240 of engine 10 and/or electric machine 280 may be connected via a transmission 254 to vehicle wheels 270 when clutches 283 is engaged. In the depicted example, a first clutch 281 is provided between crankshaft 240 and electric machine 280, and a second clutch 283 is provided between electric machine 280 and transmission 254. Controller 212 may send a signal to an actuator of each of clutches 281 and 283 to engage or disengage the clutches, so as to connect or disconnect crankshaft 240 from electric machine 280 and the components connected thereto, and/or connect or disconnect electric machine 280 from transmission 254 and the components connected thereto. Transmission 254 may be a gearbox, a planetary gear system, or another type of transmission. The powertrain may be configured in various manners including as a parallel, a series, or a series-parallel hybrid vehicle. Electric machine 280 receives electrical power from a traction battery 274 to provide torque to vehicle wheels 270. Electric machine 280 may also be operated as a generator to provide electrical power to charge traction battery 274, for example during a braking operation.

Combustion chamber 30 may receive intake air from intake manifold 244 (similar to 122 of FIG. 1) via intake passage 242 (similar to 138 of FIG. 1) and may exhaust combustion gases via exhaust passage 248 (similar to 136 of FIG. 1). Intake manifold 244 and exhaust passage 248 can selectively communicate with combustion chamber 30 via respective intake valve 252 and exhaust valve 254. In some embodiments, combustion chamber 30 may include two or more intake valves and/or two or more exhaust valves.

Intake valve 252 may be controlled by controller 212 via electric valve actuator (EVA) 251. Similarly, exhaust valve 254 may be controlled by controller 212 via EVA 259. Alternatively, the variable valve actuator may be electro hydraulic or any other conceivable mechanism to enable valve actuation. During some conditions, controller 212 may vary the signals provided to actuators 251 and 259 to control the opening and closing of the respective intake and exhaust valves. The position of intake valve 252 and exhaust valve 254 may be determined by valve position sensors 243 and 257, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT 255.

The VCT 255 may be a twin independent variable camshaft timing system, for changing intake valve timing and exhaust valve timing independently of each other. Further, the VCT 255 may be configured to advance or retard valve timing by advancing or retarding cam timing and may be controlled by controller 212. Further, the VCT 255 may be configured to vary the timing of valve opening and closing events by varying the relationship between the crankshaft position and the camshaft position. For example, VCT 255 may be configured to rotate intake camshaft independently of the crankshaft to cause the valve timing to be advanced or retarded. In some embodiments, VCT 255 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser). In another example, the camshaft position may be changed via a hydraulically operated cam phaser. Signal lines can send control signals to and receive a cam timing and/or cam selection measurement from the VCT. By adjusting the variable cam timing, a volumetric efficiency of the engine may be varied. As elaborated herein, VCT may also be adjusted during torque transients to improve boosted engine response.

Fuel injector 66 (similar to 66 of FIG. 1) is shown coupled directly to combustion chamber 30 for injecting fuel directly therein in proportion to the pulse width of signal FPW received from controller 212 via electronic driver 268. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 244 in a configuration that provides what is known as port injection of fuel into the intake port upstream of combustion chamber 30. One or more exhaust fuel injectors (not shown) may also be positioned within the exhaust manifold and/or downstream of the particulate filter in order to provide optimal conditions for regenerating the particulate filter.

Ignition system 288 can provide an ignition spark to combustion chamber 30 via spark plug 292 in response to spark retard signal from controller 212, under select operating modes. Though spark ignition components are shown, in some embodiments, combustion chamber 30 or one or more other combustion chambers of engine 10 may be operated in a compression ignition mode, with or without an ignition spark.

Intake passage 242 may include throttles 296 and 298 having throttle plates 297 and 298, respectively. In this particular example, the positions of throttle plates 297 and 298 may be varied by controller 12 via signals provided to an electric motor or actuator included with throttles 296 and 298, a configuration that is commonly referred to as electronic throttle control (ETC). In this manner, throttles 296 and 298 may be operated to vary the intake air provided to combustion chamber 30 among other engine cylinders. The positions of throttle plates 297 and 298 may be provided to controller 12 by throttle position signals TP. Pressure, temperature, and mass air flow may be measured at various points along intake passage 242 and intake manifold 244. For example, intake passage 242 may include a mass air flow sensor 220 for measuring clean air mass flow entering through throttle 298.

Engine 10 may further include a compression device such as a turbocharger (similar to turbocharger described in FIG. 1) including at least a compressor 262 (similar to 114 of FIG. 1) arranged upstream of intake manifold 244. For a turbocharger, compressor 262 may be at least partially driven by a turbine 264 (similar to 116 of FIG. 1) arranged along exhaust passage 248. Thus, the amount of compression provided to one or more cylinders of the engine via a turbocharger may be varied by controller 212. A charge air cooler 254 (similar to 118 of FIG. 1) may be included downstream from compressor 262 and upstream of intake valve 252. Charge air cooler 254 may be configured to cool gases that have been heated by compression via compressor 262, for example. In one embodiment, charge air cooler 254 may be upstream of throttle 282. Pressure, temperature, and mass air flow may be measured downstream of compressor 262, such as with sensor 245 or 247. The measured results may be communicated to controller 212 from sensors 245 and 247 via signals 246 and 249, respectively. Pressure and temperature may be measured upstream of compressor 262, such as with sensor 293, and communicated to controller 212 via signal 295. The clean air mass flow may be communicated to controller 212 via the MAF signal. Further, a pressure of the air charge within the intake manifold 244 may be sensed and communicate to controller 212 via the manifold air pressure (MAP) sensor. Further, a temperature of the air charger within intake manifold 244 may be measured by manifold air temperature (MAT) sensor and communicated to controller 212. Further, a pressure of compressed air upstream of intake throttle 263 and downstream of compressor 262 may be sensed by throttle inlet pressure (TIP) sensor, such as sensor 245. Specifically, boost levels in engine system may be measured by TIP sensor via measuring TIP (also termed, boost pressure).

Further, in the disclosed embodiments, an EGR system may route a desired portion of exhaust gas from exhaust passage 248 to intake manifold 244. FIG. 2 shows an LP-EGR system similar to the low pressure EGR system of FIG. 1. The LP-EGR is routed through LP-EGR passage 250 from downstream of turbine 264 to upstream of compressor 262. The amount of LP-EGR provided to intake manifold 244 may be varied by controller 212 via LP-EGR valve 267. Further, the LP-EGR system may include LP-EGR cooler 258 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas.

Exhaust gases exiting combustion chambers 30 and exhaust passage 248 spin exhaust turbine 264 which is coupled to compressor 262 along shaft 263. The amount of compression provided to one or more cylinders of the engine via turbocharger may be varied by controller 212. When reduced turbine torque is desired, some exhaust flow may be directed through a waste-gate 282 bypassing the turbine. The waste-gate 282 (also termed, exhaust waste-gate, similar to 103 of FIG. 1) may be coupled across exhaust turbine 264 in turbocharger. By adjusting a position of waste-gate 282 via controller 212, an amount of boost provided by the turbocharger may be controlled. Thus, the waste-gate 282 may be a boost actuator. Herein, controller 212 may provide a signal based on the desired boost to adjust an electromechanical actuator coupled to waste-gate 282. The combined flow from the turbine 264 and the waste-gate 282 may then flow through emission control device 271 and 272.

Depending on operating conditions, a portion of exhaust gases may be recirculated from the exhaust passage 248, downstream of turbine 264, to intake passage 242, upstream of compressor 262 via exhaust gas recirculation (EGR) passage 250. The portion of exhaust gases may flow through EGR passage 250 via EGR cooler 258 and LP-EGR valve 267. In this manner, low pressure EGR (LP-EGR) may be enabled. LP-EGR valve 267 may be opened (e.g., an opening of the EGR valves may be increased) to admit a controlled amount of cooled exhaust gas to the intake passage for desirable combustion and emissions-control performance. As such, LP-EGR valve 152 may be actuated by an actuator (e.g., electric, mechanical, hydraulic, etc.) based on commands received from controller 212.

Each cylinder 30 may be serviced by one or more valves. In the present example, each cylinder 30 includes a corresponding intake valve 252 and an exhaust valve 254. Each intake valve 252 and exhaust valve 254 may be held at a desired position via a corresponding spring. Engine system 200 further includes one or more camshafts (not shown) for operating intake valve 252 and/or for operating exhaust valve 254. In one example, intake camshaft may be coupled to intake valve 252 and can be actuated to operate intake valve 252. In another example, exhaust camshaft may be coupled to exhaust valve 254 and can be actuated to operate exhaust valve 254. In some embodiments, where the intake valve of a plurality of cylinders 30 are coupled to a common camshaft, intake camshaft may be actuated to operate the intake valves of all the coupled cylinders.

Intake valve 252 is actuatable between an open position that allows intake air into the corresponding cylinder and a closed position substantially blocking intake air from the cylinder. Intake camshaft (not shown) may be included in intake valve actuation system which is in communication with controller 212. Intake camshaft may include an intake cam which has a cam lobe profile for opening intake valve 252 for a defined intake duration. In some embodiments (not shown), the camshaft may include additional intake cams with an alternate cam lobe profile that allows the intake valve 252 to be opened for an alternate duration (herein also referred to as a cam profile switching system). Based on the lobe profile of the additional cam, the alternate duration may be longer or shorter than the defined intake duration of intake cam. The lobe profile may affect cam lift height, cam duration, and/or cam timing. In one example, intake camshaft is shifted to a more advanced timing. By opening the intake valve earlier, burned gas back is allowed to flow into the intake port, thereby displacing the air that would have been ingested during a subsequent intake stroke. In another example, when intake camshaft is shifted to a more retarded timing, the intake valve may be opened later. As a result, the intake valve is closed well into the compression stroke, resulting in the cylinder air being pushed back into the intake port with less air being retained in the cylinder. A controller may be able to switch the intake valve duration by moving intake camshaft 68 longitudinally and switching between cam profiles.

In the same manner, each exhaust valve 254 is actuatable between an open position allowing exhaust gas out of the corresponding cylinder and a closed position substantially retaining gas within the cylinder and blocking the exit of exhaust gases from the cylinder. As such, early exhaust valve opening may have limited impact on air charge. Exhaust camshaft (not shown) may be included in exhaust valve actuation system which is in communication with controller 212. Exhaust camshaft may include an exhaust cam which has a cam lobe profile for opening exhaust valve 254 for a defined exhaust duration. In some embodiments, where the exhaust valve of a plurality of cylinders 30 is coupled to a common camshaft, the exhaust camshaft can be actuated to operate the exhaust valves of all the coupled cylinders. In some embodiments, the exhaust camshaft may further include additional exhaust cams with an alternate cam lobe profile that allows exhaust valve 254 to be opened for an alternate duration. The lobe profile may affect cam lift height, cam duration, and/or cam timing. In one example, when the exhaust camshaft is shifted to a more retarded timing, the exhaust valve may be opened later, allowing burned gas to flow back into the port due to increased overlap with intake valve opening, and thereby displacing the air that will be ingested during subsequent intake stroke. In another example, when the exhaust camshaft is shifted to a more advanced timing, then exhaust valve may be opened earlier with minimal impact on the air charge. A controller may be able to switch the exhaust valve duration by moving the exhaust camshaft longitudinally and switching between cam profiles.

Intake valve actuation system and exhaust valve actuation system may further include push rods, rocker arms, tappets, etc. Such devices and features may control actuation of the intake valve 252 and the exhaust valve 254 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 254 and intake valve 252 of one or more cylinders may be actuated by a common camshaft. Further still, in some examples, some of the intake valves 252 and/or exhaust valves 254 may be actuated by their own independent camshaft or other device.

Exhaust gas sensor 226 is shown coupled to exhaust passage 248 downstream of turbine 264. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 271 and 272 are shown arranged along exhaust passage 48 downstream of exhaust gas sensor 126. In the depicted example, device 271 may be a gas particulate filter (GPF), such as GPF 170 of FIG. 1 and device 272 may be a TWC, such as TWC 180 of FIG. 1.

As described with reference to FIG. 1, the engine system 200 may further include one or more exhaust fuel injectors, such as first exhaust fuel injector 67 upstream of turbine 114 and second exhaust fuel injector 68 downstream of GPF 170. Additionally, extra air may be introduced into the exhaust passage by exhaust air pump 166. By adjusting exhaust fuel and air injection at or around the particulate filter, PF temperature can be raised by varying a local exhaust air-fuel ratio independent of the overall combustion air-fuel ratio. As a result, filter regeneration can be expedited.

Controller 212 is shown in FIG. 2 (similar to controller 12 of FIG. 1) as a microcomputer, including microprocessor unit 202, input/output ports 204, an electronic storage medium for executable programs and calibration values shown as read only memory chip 206 in this particular example, random access memory 208, keep alive memory 210, and a data bus. Controller 212 may receive various signals from sensors coupled to engine 10, in addition to those signals previously discussed, including measurement of inducted mass air flow (MAF) from mass air flow sensor 220; engine coolant temperature (ECT) from temperature sensor 215 coupled to cooling sleeve 214; a profile ignition pickup signal (PIP) from Hall effect sensor 218 (or other type) coupled to crankshaft 240; throttle position (TP) from a throttle position sensor; boost pressure from a throttle inlet pressure (TIP) sensor; and absolute manifold pressure signal, MAP, from sensor 222. Engine speed signal, RPM, may be generated by controller 212 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 218, which is also used as an engine speed sensor, may produce a predetermined number of equally spaced pulses every revolution of the crankshaft.

Based on the signals received from the various sensors of FIGS. 1 and 2, and instructions stored on a memory of the controller, controller 212 employs the various actuators of FIGS. 1-2 to adjust engine operation. As non-limiting examples, controller 212 may send signals to actuate electric motor 111 of FIG. 1 in order to increase turbine torque, open waste-gate (e.g., 130 of FIG. 1 or 282 of FIG. 2) to direct exhaust gas to a downstream GPF (e.g., 170 of FIG. 1 and 271 of FIG. 2), create cylinder-to-cylinder air-fuel imbalance by commanding air and fuel differently to each cylinder, etc. As another example, controller 212 may be configured to estimate the amount of particulates accumulated in the PF (also referred herein as GPF load) by measuring the differential pressure across the GPF (from sensors 141 and 142 of FIG. 1). If the differential pressure is above a threshold for initiating regeneration, but exhaust temperature is note is high enough to initiate particulate filter regeneration, the controller 212 may adjust one or more engine operating parameters including spark timing, cylinder fueling, boost pressure, and air-fuel ratio, to raise the exhaust temperature so as to expedite filter regeneration.

In this way, the components of FIGS. 1-2 enables a system comprising an engine; a turbocharger including an intake compressor coupled to an exhaust turbine via a shaft, and an electric motor; a waste-gate valve coupled in a bypass around the exhaust turbine; an exhaust passage including a particulate filter and an exhaust catalyst, the exhaust catalyst coupled downstream of the particulate filter; an exhaust air pump for flowing air into the exhaust passage, upstream of the particulate filter; an exhaust fuel injector for injecting fuel into the exhaust passage, downstream of the particulate filter and upstream of the exhaust catalyst; and a controller. The controller may be configured with computer-readable instructions stored on non-transitory memory for: operating in a first mode to heat the particulate filter, the operating in the first mode including operating the turbocharger via the electric motor with the waste-gate valve open, operating the engine with cylinder-to-cylinder air-fuel imbalance, the imbalance adjusted to provide stoichiometric exhaust air-fuel ratio; and responsive to a temperature of the particulate filter exceeding a threshold, transitioning to operating in a second mode to regenerate the particulate filter, operating in the second mode including operating the engine leaner than stoichiometry while injecting fuel into the exhaust passage via the exhaust fuel injector, the exhaust fuel injection adjusted based on a degree of leanness of engine operation. In one example, operating the engine leaner than stoichiometry in the second mode includes operating the engine with cylinder fueling deactivated when vehicle speed is lower than a threshold, and operating the engine with cylinder fueling adjusted to be leaner than stoichiometry when the vehicle speed is higher than the threshold. The controller may include further instructions for, while operating in the first mode, continually estimating an oxygen load of the exhaust catalyst, and responsive to the estimated oxygen load being higher than a threshold load, reducing the air-fuel imbalance. While operating in the second mode, the controller may further operate the exhaust air pump responsive to the exhaust air-fuel ratio measured downstream of the particulate filter. Herein, operating the turbocharger via the electric motor includes adjusting an output of the electric motor to spin the intake compressor at a speed based on driver torque demand while the waste-gate valve is maintained fully open. The controller may additionally operate in the first mode responsive to a higher than threshold particulate load at the particulate filter, and transition out of the second mode responsive to a lower than threshold particulate load at the particulate filter.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring now to FIG. 3, an example routine for regenerating a particulate filter is shown. In the present example, regeneration of a gasoline particulate filter (GPF) is discussed though it will be appreciated that other particulate filter configurations are also possible. Instructions for carrying out routine 300 and the rest of the methods included herein may be executed by a controller, such as controller 12 of FIG. 1 and controller 212 of FIG. 2, based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, engine operating conditions may be estimated and/or inferred. These may include, for example, engine speed, engine load, driver torque demand, ambient conditions (e.g. ambient temperature and humidity, and barometric pressure), MAP, MAF, MAT, engine temperature, boost level, air-fuel ratio, etc. Once the engine operating conditions are estimated, the method proceeds to 304.

At 304, particulate filter (PF) load may be estimated based on engine operating conditions. In particular, PF load may be estimated and tracked by counting a frequency and duration of engine operation in conditions where particulate matter (PMs) may be released. For example, the controller may count a number of engine cold-starts over each drive cycle as well as a time spent in engine cold start conditions, frequency of engine operation with deep enrichment (including a degree of enrichment relative to stoichiometry and a duration of operation with enrichment), frequency of engine operation with compression injection, etc. These values may be accrued. The controller may then subtract from the accrued value periods of lean operation (e.g., leaner than stoichiometry) while the PF (e.g., GPF 170 of FIG. 1 and GPF 271 of FIG. 2) is hot (e.g., above a threshold temperature, such as above 600° C.) weighted by the mass of oxygen flowing through the filter. In another example, a soot accumulation model may be utilized to estimate the amount of soot in the particulate filter. In one example, soot accumulation may be modeled as a mass from empirically determined test results. In this model, the amount of soot expelled by an engine at different engine speeds and loads can be stored in a table or function. When the engine is operated, the table may be interrogated based on present engine speed and load to determine the amount of soot directed to a particulate filter of the exhaust system. Likewise, the oxidation rate of soot may be estimated in a similar fashion from engine exhaust oxygen concentration and particulate filter temperature. For example, a table holding oxidation rates of soot may be indexed by particulate filter temperature and mass flow rate of oxygen to the filter. In yet another example, the amount of particulates stored in a particulate filter may be estimated based on a pressure drop across the particulate filter at a given flow rate though the particulate filter. The pressure drop may be monitored via pressure sensors located in the exhaust at locations upstream and downstream of the particulate filter. The greater the pressure drop, the greater the inferred particulate matter accumulation within the particulate filter.

At 306, it may be determined if the PF load exceeds a threshold load above which exhaust backpressure generated by the loaded filter can adversely affect engine performance. In one example, the threshold load may be set at two grams per liter. The PF load may be detected, for example, by a soot sensor coupled to the particulate filter. In another example, the PF load may be estimated by utilizing a soot accumulation model. In yet another example, the PF load may be inferred based on a measured pressure drop across the PF detected via upstream and downstream pressure sensors, such as sensors 141 and 142 of FIG. 1. If the PF load does not exceed the threshold load, then the method returns to 304, where the PF load is continued to be estimated based on engine operating conditions and monitored with reference to the threshold load. Otherwise, if the PF load exceeds the threshold load, the method proceeds to 308.

At 308, it may be determined if the PF temperature exceeds a threshold temperature. In one example, the threshold temperature may be a temperature above which soot combustion occur. For example, the threshold temperature may be set to 600° C. or higher. As such, if the GPF temperature is not sufficiently high when the GPF is full of PMs and needs regeneration, a regeneration assist may be required to increase temperature, such as by retarding spark at the cost of increased fuel consumption over base. In one example, PF regeneration temperature may be set to be above 600° C. to prevent excessive combustion of wet soot, which is highly flammable and may cause uncontrolled combustion leading to PF degradation. If PF temperature exceeds the threshold temperature, then the method proceeds to 324 in FIG. 4 (which is a continuation of method 300 of FIG. 3). Otherwise, the method proceeds to 310.

At 310, if the PF is not sufficiently hot, it may be determined whether torque demand exceeds a threshold demand. For example, it may be determined if torque demand is high enough to require boosted engine operation. The inventors herein have recognized that the exothermic effect of an air-fuel imbalance between cylinders, that is used to heat the PF, can be enhanced at higher air flows. Therefore by coordinating boosted engine operation with an air-fuel imbalance, as described below, PF heating can be expedited, allowing for an earlier initiation of filter regeneration.

If torque demand does not exceed the threshold demand, meaning that the torque provided by the engine is sufficient to meet the torque request, then boost assist from an electric motor coupled to a system turbocharger may not be required. The controller may proceed to adjust engine operating parameters to increase heat rejection at the PF while maintaining lower air flow corresponding to the lower torque demand. Accordingly, at 312, engine cylinders are operated with cylinder-to-cylinder air-fuel ratio (AFR) imbalance and optionally spark timing is retarded. The spark retard and AFR imbalance may be adjusted based on a temperature deficit of the PF and current mass flow. In one example, the temperature deficit may be estimated by calculating the temperature difference between the current particulate filter temperature (e.g., inferred from sensor 141 of FIG. 1) and the threshold temperature (e.g., 600° C.). Further, current mass flow may be estimated from MAF sensor (e.g. sensor 220 of FIG. 2). A look-up table may be indexed based on the temperature deficit and mass air-flow, and may provide an output value for the amount of AFR imbalance to apply. As another example, the controller may make a logical determination for each cylinder (e.g., regarding a duty cycle to be commanded to each cylinder fuel injector) to provide the desired cylinder-to-cylinder AFR imbalance based on logic rules that are a function of the mass flow and the temperature deficit. The controller may then generate a control signal that is sent to each cylinder's fuel injector.

Operating with AFR imbalance may include operating the engine with a first number of cylinders combusting lean, a second number of cylinders combusting rich, and spark timing retard while maintaining an exhaust air-fuel ratio at stoichiometry, each of a degree of leanness and richness adjusted based on exhaust temperature. In addition, the first number and the second number may also be adjusted based on exhaust temperature (e.g., desired temperature versus measured temperature).

In one example, the AFR imbalance applied may be clipped or limited to an amount that does not cause significant torque disturbances. If the temperature deficit cannot be met by the AFR imbalance alone, a remainder of the deficit may then be addressed by retarding spark timing. As such, this reduces the reliance on spark retard, improving fuel economy. In one example, PF heating may be expedited by applying 20% torque reduction through spark retard usage and imbalanced air fuel operation (including 20% enleanment and enrichment on alternating cylinders to maintain clean emissions by having the combined air-fuel ratio be maintained at stoichiometry).

In another example, the amount of imbalance to provide is based on a look-up table derived from mapping data of the exotherm created by each percentage imbalance for a given air mass flow. The deficit (in degrees C.) between the current GPF temperature and the threshold temperature (e.g., 600° C.) is fed into the table along with current air mass flow. The table then delivers the percent imbalance required to achieve the temperature deficit. In this way, excessive temperatures are not delivered. Additionally, an integral controller term may be added to the imbalance determined to control to a desired temperature using the imbalance amplitude as a control variable.

In one example, the controller may scale the fuel mass by multiplying the fuel mass going into each cylinder by an array indexed by the firing order. Indexing may be based on cylinder firing order. As an example, for a V6 engine configuration (having 6 cylinders arranged as two groups/banks of 3 cylinders), having cylinders 1-3 on a first bank and cylinders 4-6 on a second bank, the firing sequence may be 1-4-2-5-3-6, wherein index 0 is cyl 1, index 1 is cyl 4, etc. The indexing may proceed through the firing order until all cylinders have fired, and then the indexing is repeated. To provide symmetric heating calibration for the V6 engine, the fuel mass multipliers applied for the imbalance generation may be: [1.2, 1.2, 0.9, 0.9, 0.9, 0.9], wherein 1.0 refers to fuel mass at stoichiometry, 0.9 refers to a 10% enleanment, and 1.2 refers to a 20% enrichment. Alternatively, to provide asymmetric heating calibration for the V6 engine, such as to one bank only, the fuel mass multipliers applied for the imbalance generation may be: [1.2, 1.0, 0.9, 1.0, 0.9, 1.0], wherein 1.0 refers to fuel mass at stoichiometry, 0.9 refers to a 10% enleanment, and 1.2 refers to a 20% enrichment. As another example, for an I4 engine configuration (having 4 cylinders arranged in-line), having cylinders 1-4, the firing sequence may be 1-3-4-2, the heating calibration may include fuel mass multipliers: [0.8, 1.2, 0.8, 1.2], wherein 1.0 refers to fuel mass at stoichiometry, 0.8 refers to a 20% enleanment, and 1.2 refers to a 20% enrichment. The sum of the deviations from 1 may be arranged such that they equal 0, or equivalently, the sum of the factors equals the number of cylinders. As a result, the overall air-fuel ratio is maintained around stoichiometry even after applying the cylinder-to-cylinder imbalance.

In some examples, the mapping of the AFR imbalance may be further adjusted based on the temperature of an exhaust catalyst (e.g., TWC) located downstream of the PF so as to limit catalyst degradation due to overheating. For example, an Inferred Catalyst temperature Model may be used to enhance the AFR mapping. Therein, the model is used to estimate an exotherm at the exhaust catalyst based on inputs of percentage imbalance and the airflow mass. If the estimated exotherm exceeds a threshold temperature for the catalyst, the amplitude of the imbalance may be reduced. This ensures that the light-off catalyst is not damaged by over-temperature.

It will be appreciated that if the torque demand exceeds the threshold achievable with the spark and AFR imbalance, then the spark and imbalance may be blended out, as required, to meet the torque demand, starting with the imbalance. For example, the imbalance may be reduced or discontinued while the spark retard is maintained, and then spark retard usage may be reduced or discontinued. Discontinuing the imbalance first may provide a superior NVH (noise, vibration, and harshness) feel compared to leaving it in while discontinuing spark retard first. A sufficiently large torque request may quickly negate the need for any special heating actions. The method may then proceed to 318.

Returning to 310, if the torque demand is higher than the threshold demand, it may be inferred that the current engine torque may be insufficient to meet operator torque demand and that an electric assist may be needed. In addition, a higher air flow required to meet the elevated torque demand can be opportunistically used to enhance the exothermic effect of a PF heating cylinder AFR imbalance operation. Further, heated exhaust generated via boosted engine operation may be diverted to the PF via the waste-gate while a compressor speed is maintained via electric assist. Accordingly at 314, the engine is operated boosted with a turbocharger spun via an electric motor while the opening of a waste-gate coupled across an exhaust turbine of the turbocharger is increased to direct exhaust gas to the PF, bypassing the turbine. In one example, the waste-gate is fully opened. By opening the waste-gate, hot exhaust is directed to heat the GPF<reducing heat lost at the turbine. In addition, to maintain an elevated engine speed, transmission downshifts are delayed. Spinning the compressor via the electric motor includes estimating a compressor speed required to provide a boost pressure corresponding to the torque demand, and then adjusting an output (e.g., rotation speed) of the electric motor coupled to the turbocharger (e.g., to the turbocharger shaft) based on the required compressor speed relative to the current compressor speed. The electric motor output may be further adjusted based on the opening of the waste-gate, and thereby the turbine speed. For example, as the waste-gate opening is increased to divert more exhaust gas to the PF, the output of the electric motor may be increased. In this way, the increase in torque demand may be met without raising engine speed by spinning the compressor with electric energy provided via the electric motor to deliver boost, while the exhaust energy is directed to heat the particulate filter. As a result, the downstream PF may be heated without loss of engine performance.

At 316, while spinning the turbocharger compressor via the electric motor with the waste-gate open, the cylinders may be operated with AFR imbalance. The imbalance (e.g., degree of enrichment/enleanment) may be adjusted based on a temperature deficit remaining after operating with the waste-gate open, and further based on current mass flow. In one example, by relying on the elevated engine speed and flow of exhaust to the PF to provide a portion of the PF heating, the AFR imbalance required may be lower (than the corresponding AFR imbalance applied at lower torque levels, such as at 312). In another example, by relying on the increased flow from the electric turbocharger, the engine speed may be lowered while driving at low speeds to maintain customer satisfaction with the noise from a lower rpm level.

From each of 316 and 312, the method proceeds to 318 where an exhaust air-fuel ratio downstream of the PF, such as at the three-way catalyst (TWC) is assessed. In particular, it is determined if oxygen break-through is detected at the three-way catalyst (TWC). As one example, if a lean air-fuel ratio is measured at or downstream of the TWC, the AFR imbalance may be adjusted. As such, oxygen break-through at the TWC may result in the need for additional fuel enrichment to reactivate the TWC. Therefore, in response to the oxygen break-through, the AFR imbalance is adjusted to reactivate the TWC. As an example, if the post catalyst HEGO sensor output indicates that a higher than threshold amount of oxygen is breaking through, the controller may reduce or limit the amplitude of the AFR imbalance modulation. For example, the controller may reduce the amplitude of the AFR imbalance from 20% enleanment/enrichment to 10% enleanment/enrichment. In another example, adjusting the AFR imbalance includes decreasing the imbalance from 10% to 5% in response to the exhaust temperature nearly achieving its target. In further examples, the AFR imbalance may be reduced or limited responsive to a temperature at the downstream exhaust catalyst exceeding a temperature above which catalyst degradation can occur.

In still other examples, the AFR imbalance may be maintained while an exhaust air and fuel injection is used to address the oxygen break-through at the TWC. For example, while maintaining the AFR imbalance, the controller may enrich the exhaust locally at the TWC via the post GPF fuel injector (e.g., fuel injector 68 of FIGS. 1-2), such as by applying a 5% enrichment. Then, the controller may inject air into the exhaust locally at the TWC via the exhaust air pump (e.g., air pump 166 of FIGS. 1-2), such as by applying a 5% enleanment based on the 5% fuel enrichment. As another example, the downstream air pump may react with a 5% enriched mixture coming from the cylinders to maintain stoichiometric combustion while heating the particular filter.

In this way, exhaust temperature is raised according to the deficit in temperature and no excessive temperatures may be delivered. Further, the overall amount of spark retard required may be reduced. Further, the approach enables heating of only one bank of cylinders, if required.

At 320 (As at 308), it may be determined if the PF temperature is higher than a threshold temperature, above which PF regeneration can be initiated. For example, it may be determined if the PF temperature is above 600° C. If the threshold temperature has been reached, then the method proceeds to 324 of FIG. 4. Otherwise, the method proceeds to 322.

At 322, if the threshold PF temperature has not been reached, spark retard is adjusted while operation of one or more of the exhaust fuel injector and exhaust air pump operation is used to raise the exhaust temperature. In one example, where the engine was operating with air-fuel imbalance and no spark retard, the air-fuel imbalance may be maintained while spark timing is retarded from MBT. In another example, where the engine was operating with air-fuel imbalance and at least some spark retard, the air-fuel imbalance may be maintained while spark timing is further retarded from MBT to rapidly raise the exhaust temperature, and thereby the PF temperature.

In addition, one or more of exhaust fuel injection and exhaust air pump operation may be used to raise the exhaust temperature, and thereby the PF temperature. For example, while maintaining the AFR imbalance and operating the engine around stoichiometry, and while retarding spark timing, the controller may enrich the exhaust locally at the GPF via the pre GPF fuel injector (e.g., fuel injector 67 of FIGS. 1-2), such as by applying a 5% enrichment. Then, the controller may inject air into the exhaust locally at the GPF via the exhaust air pump (e.g., air pump 166 of FIGS. 1-2), such as by applying a 5% enleanment based on the 5% fuel enrichment.

In still another example, the engine may be operated lean while fuel is injected via the exhaust fuel injector. As an example, the engine may be operated 10% leaner than stoichiometry and while the engine is operating lean, 10% fuel enrichment may be provided in the exhaust via exhaust fuel injection (e.g., via exhaust fuel injector 67 of FIG. 1) to generate an additional exotherm at the particulate filter. In still another example, the engine may be operated rich while air is injected via the exhaust air pump. As an example, the engine may be operated 10% richer than stoichiometry, and while the engine is operating rich, 10% enleanment may be provided by pumping air into the exhaust (e.g., via exhaust air pump 166 of FIG. 1) to heat the PF without a loss in engine torque. In still further examples, the engine may be operated at stoichiometry, and each of exhaust air and fuel injection may be used to heat the GPF. For example, while the engine operates at stoichiometry, 10% enrichment may be provided at the exhaust via exhaust fuel injection while a corresponding 10% enleanment is provided at the exhaust by pumping air into the exhaust via the exhaust air pump to cause additional particulate filter heating. In this way, the particulate filter maybe heated rapidly to initiate regeneration without loss in engine performance and without causing over-heating of the turbine.

In further examples, if there is an issue with the temperature measurements or estimations, such as due to a degraded sensor, the air-fuel imbalance may be disabled. However, a separate diagnostic code is not triggered responsive to the air-fuel imbalance being disabled. Diagnostics on the temperature estimates and the pressure and soot estimates may be sufficient. In still further examples, diagnostics on the imbalance delivery itself may be performed for system with un-degraded temperature sensors. Therein, the exhaust or PF temperature may be monitored for a defined duration (e.g. 20 seconds) when the imbalance is started. If a higher than threshold rise in temperature is observed, the diagnostic passes, and the imbalance delivery is determined to not be degraded.

From each of 308 and 322, once the GPF is sufficiently heated, the method moves to 324 to regenerate the filter by burning off the soot opportunistically or actively. As such, the PF needs to be sufficiently hot before regeneration can be initiated to improve the regeneration efficiency. Specifically, at 324, it may be determined if deceleration fuel shut-off (DFSO) conditions are present/detected or expected. In one example, DFSO conditions may be confirmed responsive to a lower than threshold torque demand (such as when an accelerator pedal is not being depressed or when a brake pedal is being depressed), and vehicle speed being lower than a threshold (such as when a vehicle is decelerating). During such conditions, cylinder fueling may be temporarily cut off (by deactivating cylinder fuel injectors), while cylinder valves continue to open and close so that only air flows through the cylinders. In some example, a GPS/navigation system coupled to the engine controller may be used to predict when DFSO conditions are expected. Information retrieved via the GPS that is used to predict DFSO conditions being met may include, for example, route direction, traffic information, and/or weather information. As an example, responsive to an increase in traffic, it may be predicted that the vehicle will be slowing down or halting. As another example, during a downhill vehicle travel, DFSO conditions may be present. By predicting when DFSO condition will be met, the controller may be able to plan when to opportunistically initiate a regeneration. The air flow through the cylinders (with no fuel injection) during the DFSO may create a lean condition at the GPF which may be opportunistically used to burn off the soot from the hot GPF. If DFSO conditions are confirmed, the method may proceed to 326.

At 326, responsive to DFSO conditions being met, fuel to the cylinders may be cut off while cylinder valves continue to pump air through the cylinder. As a result, the concentration of oxygen in the exhaust flowing to the PF increases, burning off the soot at the PF. In this way, the PF may be regenerated opportunistically and passively. The method then moves to 334 where the PF load estimate and the PF regeneration history is updated in the controller's memory based on the DFSO. For example, an amount of soot burned off may be estimated based on a duration of the DFSO and the PF load may be updated to account for the drop in soot level.

If DFSO conditions are not detected or expected, then the method proceeds to 328 to actively regenerate the PF. Therein, lean conditions are actively generated at the exhaust to burn off the soot. Specifically, at 328, the engine is run leaner than stoichiometry to burn off particulate matter from the PF. In one example, the engine may be operated 5% leaner than stoichiometry to provide excess oxygen to burn carbon soot off the GPF. For example, the engine may be operated leaner than stoichiometry when the engine is at idle and while the vehicle speed is lower than a threshold speed (and while the PF is sufficiently hot). Optionally, if the engine is under part load and the vehicle speed is higher than the threshold speed, and while the PF is sufficiently hot, the controller may briefly cut fuel to actively create a temporary DFSO condition and provide excess oxygen to burn off the soot.

At 330, the controller may perform a rich fuel injection via the exhaust fuel injector to maintain overall stoichiometric exhaust air-fuel ratio. As an example, the rich fuel injection may be adjusted to compensate for the lean engine operation. Thus where the engine is operated 5% lean, the injection may be a 5% rich fuel injection.

At 332, any deficit in torque demand incurred during the regeneration may be met by spinning the turbocharger with electric assist from the electric motor. In one example, an increase in torque demand that is received while the engine is operating lean may be met without raising engine speed by spinning the turbocharger compressor with electric energy provided via the electric motor. The method then moves to 334 where the PF load estimate and the PF regeneration history is updated in the controller's memory based on the active regeneration. For example, an amount of soot burned off may be estimated based on a duration of lean engine operation and the PF load may be updated to account for the drop in soot level. In one example, the active regeneration is continued until the PF load drops below a lower threshold below which exhaust backpressure generated due to the PF does not affect engine performance.

From 334, once the PF load is sufficiently reduced, the method moves to 336 where stoichiometric engine operation may be resumed. This includes resuming engine operation with cylinder fueling enabled if the PF load was reduced during DFSO operation. As another example, this includes adjusting fuel injection relative to air flow in the engine cylinders to operate at stoichiometry if the PF load was reduced using lean engine operation.

At 338, the oxygen loading of the exhaust catalyst (e.g., the TWC) positioned downstream of the GPF may be estimated and the TWC oxygen loading may be adjusted responsive to any changes incurred during the PF regeneration. In one example, the TWC may become oxygen saturated due to flow of excess oxygen through the GPF during the regeneration. To regenerate or reactive the TWC, the controller may adjust the air-fuel ratio at the exhaust catalyst, by combusting rich and lean about stoichiometry, so as to regenerate the catalyst. In one example, the controller may apply a rich fuel injection via the post GPF injector to reactivate the exhaust catalyst. In this way, PF regeneration can be improved by generating an exotherm to expedite PF heating.

As an example, a controller may generate an exotherm at an exhaust particulate filter while continuing to provide driver demanded torque by spinning a turbocharger compressor via an electric motor and concurrently operating engine cylinders with cylinder-to-cylinder air-fuel imbalance, the imbalance adjusted to maintain an overall stoichiometric exhaust air-fuel ratio. The generating may be responsive to the particulate filter having a higher than threshold particulate matter load and a lower than threshold temperature while driver demanded torque is higher than a threshold torque. Operating engine cylinders with cylinder-to-cylinder air-fuel imbalance may include operating a first set of cylinders at richer than stoichiometry while operating a second set of cylinders at leaner than stoichiometry, a number of cylinders in each of the first set and the second set based on each of a difference between measured particulate filter temperature and the threshold temperature, and a measured mass air flow. Operating engine cylinders with cylinder-to-cylinder air-fuel imbalance may further include operating the first set of cylinders with a first degree of richness and the second set of cylinders with a second degree of leanness, the first degree of richness and the second degree of leanness selected based on the difference and further based on the number of cylinders in each of the first set and the second set, wherein the first degree of richness, the second degree of leanness, and the number of cylinders in each of the first set and the second set is adjusted to maintain the overall stoichiometric exhaust air-fuel ratio. The controller may further estimate an oxygen breakthrough at an exhaust catalyst coupled downstream of the particulate filter based on output from an exhaust oxygen sensor; and feedback adjusts the imbalance based on the estimated oxygen break-through. Further, the controller may retard spark timing based on the feedback adjusted imbalance to maintain the generated exotherm. In another example, the controller may, responsive to the particulate filter having the higher than threshold particulate matter load and the lower than threshold temperature while driver demanded torque is lower than the threshold torque or while a state of charge of a battery coupled to the electric motor is lower than a threshold charge, further heat the particulate filter by retarding spark timing and concurrently operating the engine cylinders with the cylinder-to-cylinder air-fuel imbalance. Generating the exotherm while continuing to provide driver demanded torque may include opening an exhaust waste-gate valve to direct exhaust gas to the particulate filter while bypassing an exhaust turbine coupled to the turbocharger compressor, and adjusting an output of the electric motor based on current compressor speed relative to a target compressor speed based on the driver demanded torque. The controller may further delay a transmission downshift responsive to the driver demanded torque being higher than the threshold torque. Also, responsive to the particulate filter temperature being lower than the threshold temperature after generating the exotherm, the controller may operate an exhaust air pump to inject air into the exhaust, upstream of the turbine, while concurrently operating an exhaust fuel injector to inject fuel into the exhaust, downstream of the particulate filter, the air injection adjusted based on a temperature deficit between the particulate filter temperature and the threshold temperature after generating the exotherm, the fuel injection adjusted based on the air injection to maintain a stoichiometric air-fuel ratio. The controller may also, responsive to the particulate filter temperature being higher than the threshold temperature after generating the exotherm, operate the engine leaner than stoichiometry while injecting fuel via the exhaust fuel injector, a degree of enrichment based on the amount of enleanment in the cylinders to maintain a stoichiometric air-fuel ratio.

Figure 6:
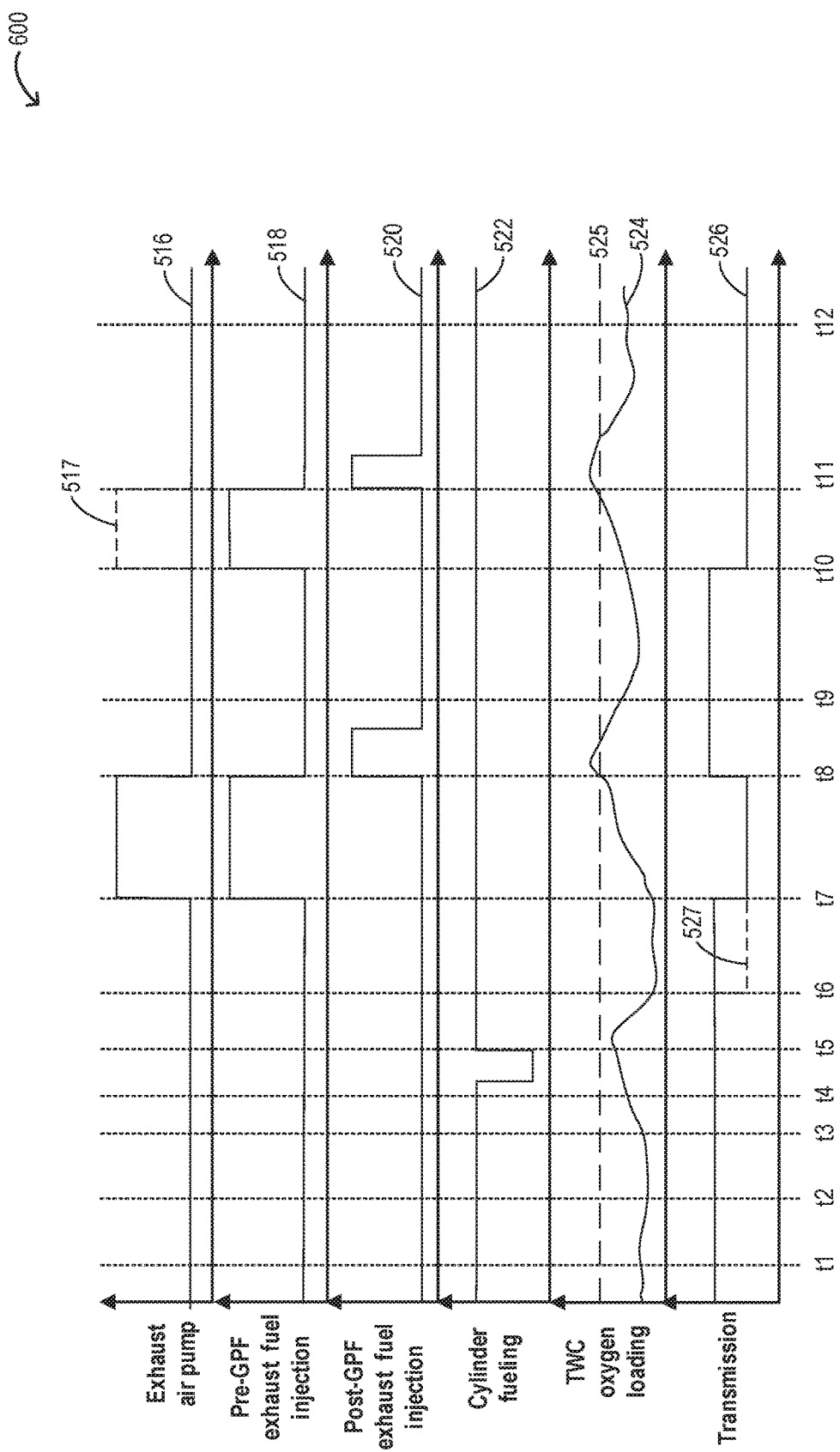

Turning now to FIGS. 5-6, example GPF heating and regeneration events are shown. It will be appreciated that maps 500-600 depict different parameters over the same time frame (t0-t12). Map 500 depicts operator torque demand as inferred from an accelerator pedal position (PP) at plot 502. The soot load on an exhaust GPF (PF load) is depicted at plot 504, relative to an upper threshold Thr_U and a lower threshold Thr_L. The GPF temperature is depicted at plot 506. Operation of the engine with cylinder-to-cylinder air-fuel ratio imbalance (AFR imbalance, on or off) is depicted at plot 508. Spark timing retard from MBT is shown at plot 510. The opening of an exhaust waste-gate coupled across an exhaust turbine of the engine's turbocharger is shown at plot 512. The operation of an intake compressor of the turbocharger with electric assist is shown at plot 514. As such, the compressor can be driven via only the turbine, only the electric assist, or both. At map 600 of FIG. 6, the operation of an exhaust air pump delivering air upstream of the turbine and the GPF is shown at plot 516. The operation of a pre-GPF exhaust fuel injector is shown at plot 518, while the operation of a post-GPF exhaust fuel injector, located upstream of an exhaust three-way catalyst (TWC), is shown at plot 520. Cylinder fueling (on or off) is shown at plot 522. The oxygen loading of the TWC relative to a threshold 525 is shown at plot 524. Transmission shifts are depicted at plot 526. All plots are depicted over the same time frame (t0412) with significant events indicated via time markers t1-t12.

Prior to t1, the engine is operating responsive to low driver demand. PF soot load is below a threshold Thr_U where regeneration is triggered. PF temperature is also low. Spark timing is at or around MBT and the engine is fueled but is not operating with air-fuel ratio (AFR) imbalance. Due to the low driver demand, the waste-gate is open due to there being no need for boost pressure. For the same reason, electric assist is not needed. No exhaust heating is required so both the exhaust fuel injectors and the exhaust air pump are disabled. The exhaust TWC is not oxygen loaded and the transmission is in gear.

At t1, responsive to an increase in torque demand (plot 502), the PF load starts to increase (plot 504). In addition, due to the higher engine load, the exhaust temperature (plot 506) starts to rise. At t2, the PF load reaches threshold Thr_U indicating that the filter needs to be regenerated. However, at t2, the temperature of the PF is not high enough to enable the regeneration to be initiated. Therefore, filter heating is expedited by operating the engine with air-fuel imbalance (plot 508). The imbalance applied may be adjusted as a function of a difference between the PF temperature at t2 and the temperature threshold 505. Spark timing is maintained at MBT and between t2 and t3, the exhaust PF is heated using cylinder AFR imbalance. However, at t3, the PF temperature is still not high enough. Therefore to further expedite PF heating, between t3 and t4, while continuing to operate the engine with cylinder AFR imbalance, spark timing is retarded by an amount (plot 510). As such, the amount of spark retard applied may be less than that otherwise required to heat the exhaust, resulting in a smaller fuel penalty. While the engine is operated with cylinder AFR imbalance, the oxygen loading of the exhaust TWC increases, but remains below a threshold 525 where the TWC needs to be reactivated (plot 524). At t4, the PF temperature exceeds threshold 505 and the PF is deemed to be sufficiently hot to initiate regeneration. Therefore the AFR imbalance is disabled and spark timing is returned to MBT.

Also at t4, based on vehicle operating conditions as well as traffic and route conditions, it may be determined that a DFSO is imminent. Therefore, an active PF regeneration is not initiated. Instead, the controller opts to regenerate the PF passively when the DFSO opportunity arises. Shortly after t4, there is a drop in torque demand, such as due to the vehicle being operated on a downhill segment with the operator's foot off the accelerator pedal. Responsive to the drop in torque demand, DFSO is initiated wherein cylinder fueling is disabled (plot 522) while cylinder valves continue to pump air through the cylinder. As a result of the extra oxygen flowing through the cylinders into the exhaust passage, soot is burned off the PF and the soot load starts to drop, and the PF temperature drops due to PF cooling. In addition, the oxygen loading of the TWC starts to rise further.

Shortly before t5, the PF load drops below threshold Thr_L and regeneration is deemed complete. The engine continues to be in DFSO mode so the PF load continues to drop. At t5, there is a rise in torque demand and the DFSO mode is exited by resuming cylinder fueling. The PF load starts to rise again due to engine operation at higher load. The torque demand at t5 is high enough to require boosted engine operation. The boost pressure is provided by closing the waste-gate (plot 512) so as to spin-up the turbocharger turbine which in turn drives the turbocharger compressor. Between t5 and t6, the soot load increases.

At t6, the PF load reaches threshold Thr_U indicating that the filter needs to be regenerated. However, at t6, the temperature of the PF is not high enough to enable the regeneration to be initiated. Therefore, filter heating is expedited by operating the engine with air-fuel imbalance. The imbalance applied may be adjusted as a function of a difference between the PF temperature at t6 and the temperature threshold 505. Spark timing is maintained at MBT. Further, since the torque demand is elevated, the higher air flow through the engine is advantageously used to enhance the exothermic effect of the cylinder AFR imbalance. Specifically, the waste-gate is fully opened at t6 to drive all the hot exhaust to the filter. At the same time, boost pressure is maintained by operating the turbocharger with electric assist from an electric motor coupled to the turbocharger shaft. Also, a transmission shift (e.g., downshift) is delayed (plot 526) so as to keep the engine speed elevated. For example, a transmission downshift may have been required (as shown at dashed segment 527) responsive to the engine operating at a higher load, however, the transmission shift is delayed to further assist in heating the PF.

At t7, the PF temperature exceeds threshold 505 and the PF is deemed to be sufficiently hot to initiate regeneration. Therefore the AFR imbalance is disabled. Since the torque demand remains elevated and the PF temperature is higher than threshold 505, the transmission shift is completed. Also at t7, based on vehicle operating conditions as well as traffic and route conditions, it may be determined that a DFSO is not imminent since the torque demand remains elevated. Therefore, an active PF regeneration is initiated. Therein, the turbocharger continues to operate with electric assist so as to enable higher airflow to the directed through the PF while the waste-gate remains open. The engine continues to operate at stoichiometry. An exhaust air pump is operated to add more oxygen to the exhaust, upstream of the PF, to assist in soot burn off. Also, a pre-GPF exhaust fuel injector is operated to add more fuel to the exhaust, upstream of the PF, to assist in soot burn off. The exhaust fuel injection and exhaust air injection may be adjusted to maintain stoichiometric exhaust at the downstream TWC. In alternate examples, other combinations of engine air-fuel ratio, exhaust air pump operation, and exhaust fuel injector operation may be used. For example, a rich exhaust fuel injection may be used with the engine operating leaner than stoichiometry to burn off the soot. As another example, a lean exhaust air pump operation may be used with the engine operating richer than stoichiometry to burn off the soot. Still other combinations are possible. As a result of the extra oxygen flowing through the exhaust passage, soot is burned off the PF and the soot load starts to drop, and the PF temperature drops due to PF cooling. In addition, the oxygen loading of the TWC starts to rise.

At t8, the PF load drops below threshold Thr_L and regeneration is deemed complete. Therefore the (pre-GPF) exhaust fuel injection and air pump operation are discontinued. Also at t8, oxygen breaks through the TWC, as inferred from the oxygen load exceeding threshold 525. Responsive to oxygen break-through, a post-GPF exhaust fuel injection is performed to enrich the exhaust locally at the TWC while the engine continues to operate at stoichiometry. As a result, the oxygen load of the TWC starts to drop.

Also at t8, the operator torque demand drops and the boost pressure can be met without electric assist while maintaining the waste-gate open. Also, the transmission is shifted up without delay since PF heating is not required at this time. At t9, the operator torque demand rises and the boost pressure can be met without electric assist while reducing an opening of the waste-gate. The transmission is maintained in the higher gear.

Between t8 and t10, as engine operation continues, PF load starts to rise. At t10, the PF load reaches threshold Thr_U indicating that the filter needs to be regenerated. At t10, the temperature of the PF is high enough to enable the regeneration to be initiated. Therefore, filter heating is not required. Regeneration is performed at this time by fueling the engine cylinders leaner than stoichiometry while operating the pre-GPF exhaust fuel injection to operate rich. Alternatively, the engine may be operated at stoichiometry while operating the pre-GPF exhaust fuel injection rich and while provided a corresponding amount of leanness via the exhaust air pump (as indicated by dashed segment 517).

At t11, the PF load drops below threshold Thr_L and regeneration is deemed complete. Therefore the (pre-GPF) exhaust fuel injection (and air pump operation, if applied) are discontinued and the engine resumes stoichiometric operation. Also at t11, oxygen breaks through the TWC, as inferred from the oxygen load exceeding threshold 525. Responsive to oxygen break-through, a post-GPF exhaust fuel injection is performed to enrich the exhaust locally at the TWC while the engine continues to operate at stoichiometry. As a result, the oxygen load of the TWC starts to drop.

Also at t11, the operator torque demand rises and the boost pressure can be met without electric assist while closing the waste-gate. At t12, the operator torque demand drops and boosted engine operation is not required. Accordingly the waste-gate is fully opened. After t11, and past t12, soot starts to accumulate again on the PF.

As one example, responsive to a higher than threshold load at an exhaust particulate filter, an engine controller may operate a turbocharger using electric assist with a waste-gate valve fully open, the electric assist adjusted based on torque demand, and operate the engine with a first number of cylinders combusting lean, a second number of cylinders combusting rich, and spark timing retard while maintaining an exhaust air-fuel ratio at stoichiometry, each of a degree of leanness and richness and the spark timing retard adjusted based on exhaust temperature. The controller may further maintain the operating the engine with the first number of cylinders combusting lean, the second number of cylinders combusting rich, and spark timing retard until exhaust temperature measured at the exhaust particulate filter is higher than a threshold temperature, and then, operate the engine with the exhaust air-fuel ratio leaner than stoichiometry if vehicle speed is higher than a threshold speed, and operating the engine with fuel deactivated if vehicle speed is lower than the threshold speed. While operating the engine with the exhaust air-fuel ratio leaner than stoichiometry, fuel may be injected into an exhaust passage, downstream of the particulate filter, an amount of exhaust fuel injection based on the leaner than stoichiometry air-fuel ratio. Further, while injecting fuel into the exhaust passage, air may be flowed into the exhaust passage, upstream of the particulate filter, via an exhaust air pump, an amount of air based on the exhaust fuel injection.

In this way, an exhaust particulate filter may be heated and regenerated with reduced reliance on spark retard usage and DFSO occurrence, thereby improving the fuel penalty associated with filter regeneration. By relying on cylinder-to-cylinder air-fuel imbalance to heat the filter, the need for additional hardware for heating the filter is reduced, improving cost effectiveness. Further, a GPF may be packaged at a location where heating is slow. In addition, only one engine bank may be heated at a time, if required. By ceasing the application of an air-fuel ratio imbalance once the filter is sufficiently heated, torque disturbances and oxygen break-through at a downstream exhaust catalyst is reduced. The technical effect of relying on cylinder air-fuel imbalance to heat an exhaust GPF while relying on electric assist to a turbocharger compressor to raise engine speed and maintain boost pressure is that GPF heating may be performed without a loss of engine performance. By heating the GPF with an exhaust waste-gate fully open, exhaust heat is directed to the GPF for expedited heating while heat is directed away from the turbine, improving turbine life.

As one example, a method comprises: generating an exotherm at an exhaust particulate filter while continuing to provide driver demanded torque by spinning a turbocharger compressor via an electric motor and concurrently operating engine cylinders with cylinder-to-cylinder air-fuel imbalance, the imbalance adjusted to maintain an overall stoichiometric exhaust air-fuel ratio. In the preceding example, additionally or optionally, the generating is responsive to the particulate filter having a higher than threshold particulate matter load and a lower than threshold temperature while driver demanded torque is higher than a threshold torque. In any or all of the preceding examples, additionally or optionally, operating engine cylinders with cylinder-to-cylinder air-fuel imbalance includes operating a first set of cylinders at richer than stoichiometry while operating a second set of cylinders at leaner than stoichiometry, a number of cylinders in each of the first set and the second set based on each of a difference between measured particulate filter temperature and the threshold temperature, and a measured mass air flow. In any or all of the preceding examples, additionally or optionally, operating engine cylinders with cylinder-to-cylinder air-fuel imbalance further includes operating the first set of cylinders with a first degree of richness and the second set of cylinders with a second degree of leanness, the first degree of richness and the second degree of leanness selected based on the difference and further based on the number of cylinders in each of the first set and the second set, wherein the first degree of richness, the second degree of leanness, and the number of cylinders in each of the first set and the second set is adjusted to maintain the overall stoichiometric exhaust air-fuel ratio. In any or all of the preceding examples, additionally or optionally, the method further comprises estimating oxygen break-through at an exhaust catalyst coupled downstream of the particulate filter based on output from an exhaust oxygen sensor; feedback adjusting the imbalance based on the estimated oxygen break-through; and retarding spark timing based on the feedback adjusted imbalance to maintain the generated exotherm. In any or all of the preceding examples, additionally or optionally, the method further comprises, responsive to the particulate filter having the higher than threshold particulate matter load and the lower than threshold temperature while driver demanded torque is lower than the threshold torque or while a state of charge of a battery coupled to the electric motor is lower than a threshold charge, heating the particulate filter by retarding spark timing and concurrently operating the engine cylinders with the cylinder-to-cylinder air-fuel imbalance. In any or all of the preceding examples, additionally or optionally, generating the exotherm while continuing to provide driver demanded torque includes opening an exhaust waste-gate valve to direct exhaust gas to the particulate filter while bypassing an exhaust turbine coupled to the turbocharger compressor, and adjusting an output of the electric motor based on current compressor speed relative to a target compressor speed based on the driver demanded torque. In any or all of the preceding examples, additionally or optionally, the method further comprises delaying a transmission downshift responsive to the driver demanded torque being higher than the threshold torque. In any or all of the preceding examples, additionally or optionally, the method further comprises, responsive to the particulate filter temperature being lower than the threshold temperature after generating the exotherm, operating an exhaust air pump to inject air into the exhaust, upstream of the turbine, while concurrently operating an exhaust fuel injector to inject fuel into the exhaust, downstream of the particulate filter, the air injection adjusted based on a temperature deficit between the particulate filter temperature and the threshold temperature after generating the exotherm, the fuel injection adjusted based on the air injection to maintain a stoichiometric air-fuel ratio. In any or all of the preceding examples, additionally or optionally, the method further comprises, responsive to the particulate filter temperature being higher than the threshold temperature after generating the exotherm, operating the engine leaner than stoichiometry while injecting fuel via the exhaust fuel injector, a degree of leanness based on vehicle speed.

Another example method for a vehicle engine comprises: responsive to a higher than threshold load at an exhaust particulate filter, operating a turbocharger using electric assist with a waste-gate valve fully open, the electric assist adjusted based on torque demand; operating the engine with a first number of cylinders combusting lean, a second number of cylinders combusting rich, and spark timing retard while maintaining an exhaust air-fuel ratio at stoichiometry, each of a degree of leanness and richness and the spark timing retard adjusted based on exhaust temperature. In the preceding example, additionally or optionally, the method further comprises maintaining the operating the engine with the first number of cylinders combusting lean, the second number of cylinders combusting rich, and spark timing retard until exhaust temperature measured at the exhaust particulate filter is higher than a threshold temperature, and then, operating the engine with the exhaust air-fuel ratio leaner than stoichiometry if vehicle speed is higher than a threshold speed, and operating the engine with fuel deactivated if vehicle speed is lower than the threshold speed. In any or all of the preceding examples, additionally or optionally, the method further comprises, while operating the engine with the exhaust air-fuel ratio leaner than stoichiometry, injecting fuel into an exhaust passage, downstream of the particulate filter, an amount of exhaust fuel injection based on the leaner than stoichiometry air-fuel ratio. In any or all of the preceding examples, additionally or optionally, the method further comprises, while injecting fuel into the exhaust passage, flowing air into the exhaust passage, upstream of the particulate filter, via an exhaust air pump, an amount of air based on the exhaust fuel injection.

Another example vehicle system comprises: an engine; a turbocharger including an intake compressor coupled to an exhaust turbine via a shaft, and an electric motor; a waste-gate valve coupled in a bypass around the exhaust turbine; an exhaust passage including a particulate filter and an exhaust catalyst, the exhaust catalyst coupled downstream of the particulate filter; an exhaust air pump for flowing air into the exhaust passage, upstream of the particulate filter; an exhaust fuel injector for injecting fuel into the exhaust passage, downstream of the particulate filter and upstream of the exhaust catalyst; and a controller with computer-readable instructions stored on non-transitory memory for: operating in a first mode to heat the particulate filter, the operating in the first mode including operating the turbocharger via the electric motor with the waste-gate valve open, operating the engine with cylinder-to-cylinder air-fuel imbalance, the imbalance adjusted to provide stoichiometric exhaust air-fuel ratio; and responsive to a temperature of the particulate filter exceeding a threshold, transitioning to operating in a second mode to regenerate the particulate filter, operating in the second mode including operating the engine leaner than stoichiometry while injecting fuel into the exhaust passage via the exhaust fuel injector, the exhaust fuel injection adjusted based on a degree of leanness of engine operation. In the preceding example, additionally or optionally, operating the engine leaner than stoichiometry in the second mode includes operating the engine with cylinder fueling deactivated when vehicle speed is lower than a threshold, and operating the engine with cylinder fueling adjusted to be leaner than stoichiometry when the vehicle speed is higher than the threshold. In any or all of the preceding examples, additionally or optionally, the controller includes further instructions for, while operating in the first mode, continually estimating an oxygen load of the exhaust catalyst, and responsive to the estimated oxygen load being higher than a threshold load, reducing the air-fuel imbalance. In any or all of the preceding examples, additionally or optionally, the controller includes further instructions for, while operating in the second mode, operating the exhaust air pump responsive to the exhaust air-fuel ratio measured downstream of the particulate filter. In any or all of the preceding examples, additionally or optionally, operating the turbocharger via the electric motor includes adjusting an output of the electric motor to spin the intake compressor at a speed based on driver torque demand while the waste-gate valve is maintained fully open. In any or all of the preceding examples, additionally or optionally, the controller includes further instructions for operating in the first mode responsive to a higher than threshold particulate load at the particulate filter, and for transitioning out of the second mode responsive to a lower than threshold particulate load at the particulate filter.

In another representation, the engine system is coupled in a hybrid electric vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for regenerating an exhaust particulate filter, comprising:
    generating an exotherm at the exhaust particulate filter via a controller while continuing to provide driver demanded torque by spinning a turbocharger compressor via an electric motor and concurrently operating engine cylinders with cylinder-to-cylinder air-fuel imbalance;
        wherein the cylinder-to-cylinder air-fuel imbalance is adjusted via the controller to maintain an overall stoichiometric exhaust air-fuel ratio.
2. The method of claim 1, wherein the generating is responsive to the particulate filter having a higher than threshold particulate matter load and a lower than threshold temperature while driver demanded torque is higher than a threshold torque as determined via the controller.
3. The method of claim 2, further comprising, responsive to the particulate filter having the higher than threshold particulate matter load and the lower than threshold temperature while driver demanded torque is lower than the threshold torque or while a state of charge of a battery coupled to the electric motor is lower than a threshold charge as determined via the controller, heating the particulate filter by retarding spark timing and concurrently operating the engine cylinders with the cylinder-to-cylinder air-fuel imbalance via the controller.
4. The method of claim 2, further comprising, delaying a transmission downshift via the controller responsive to the driver demanded torque being higher than the threshold torque as determined via the controller.
5. The method of claim 2, further comprising, responsive to the particulate filter temperature being lower than the threshold temperature after generating the exotherm as determined via the controller, operating an exhaust air pump to inject air into an exhaust, upstream of a turbine, while concurrently operating an exhaust fuel injector to inject fuel into the exhaust via the controller at a location downstream of the particulate filter and upstream of an exhaust catalyst, the air injection adjusted based on a temperature deficit between the particulate filter temperature and the threshold temperature after generating the exotherm as determined via the controller;
    wherein the fuel injection is adjusted based on the aft injection to maintain a stoichiometric air-fuel ratio via the controller.
6. The method of claim 5, further comprising, responsive to the particulate filter temperature being higher than the threshold temperature after generating the exotherm as determined via the controller, operating an engine leaner than stoichiometry while injecting fuel via the exhaust fuel injector, a degree of leanness based on vehicle speed via the controller.
7. The method of claim 1, wherein operating engine cylinders with cylinder-to-cylinder air-fuel imbalance includes operating a first cylinder with a richer air-fuel ratio than a second cylinders.
8. The method of claim 7, further comprising retarding spark timing of an engine via the controller to generate the exotherm.
9. The method of claim 8, further comprising:
    estimating oxygen break-through at an exhaust catalyst coupled downstream of the particulate filter based on output from an exhaust oxygen sensor via the controller;
    feedback adjusting the imbalance based on the estimated oxygen break-through via the controller; and
    retarding spark timing based on the feedback adjusted imbalance to maintain the generated exotherm via the controller.
10. The method of claim 1, wherein generating the exotherm while continuing to provide driver demanded torque includes opening an exhaust waste-gate valve to direct exhaust gas to the particulate filter while bypassing an exhaust turbine coupled to the turbocharger compressor via the controller, and adjusting an output of the electric motor based on current compressor speed relative to a target compressor speed based on the driver demanded torque via the controller.

11. A method for a vehicle engine, comprising:
responsive to a particulate filter load higher than threshold at an exhaust particulate filter as determined via a controller;
operating a turbocharger using electric assist with a waste-gate valve fully open via the controller, the electric assist adjusted based on torque demand; and
operating the engine with a first number of cylinders combusting lean, a second number of cylinders combusting rich, and spark timing retard while maintaining an exhaust air-fuel ratio at stoichiometry via the controller;
wherein each of a degree of leanness and richness and the spark timing retard is adjusted based on exhaust temperature as determined via the controller.

12. The method of claim 11, further comprising maintaining operating the engine with the first number of cylinders combusting lean, the second number of cylinders combusting rich, and spark timing retard until exhaust temperature measured at the exhaust particulate filter is higher than a threshold temperature via the controller, and then, operating the engine with the exhaust air-fuel ratio leaner than stoichiometry via the controller when vehicle speed is higher than a threshold speed as determined via the controller, and operating the engine with fuel deactivated via the controller when the vehicle speed is lower than the threshold speed as determined via the controller.

13. The method of claim 12, further comprising, while operating the engine with the exhaust air-fuel ratio leaner than stoichiometry as determined via the controller, injecting fuel into an exhaust passage, downstream of the particulate filter and upstream of an exhaust catalyst via the controller, an amount of exhaust fuel injection based on the leaner than stoichiometry air-fuel ratio as determined via the controller.

14. The method of claim 13, further comprising, while injecting fuel into the exhaust passage, flowing air into the exhaust passage, upstream of the particulate filter, via an exhaust air pump and the controller, an amount of air based on the exhaust fuel injection as determined via the controller.

15. A vehicle system, comprising:
an engine;
a turbocharger including an intake compressor coupled to an exhaust turbine via a shaft, and an electric motor;
a waste-gate valve coupled in a bypass around the exhaust turbine;
an exhaust passage including a particulate filter and an exhaust catalyst, the exhaust catalyst coupled downstream of the particulate filter;
an exhaust aft pump for flowing aft into the exhaust passage, upstream of the particulate filter;
an exhaust fuel injector for injecting fuel into the exhaust passage, downstream of the particulate filter and upstream of the exhaust catalyst; and
a controller with computer-readable instructions stored on non-transitory memory for:
operating in a first mode to heat the particulate filter via the controller, the operating in the first mode including operating the turbocharger via the electric motor with the waste-gate valve open, operating the engine with cylinder-to-cylinder air-fuel imbalance;
wherein the cylinder-to-cylinder air-fuel imbalance is adjusted to provide stoichiometric exhaust air-fuel ratio as determined via the controller; and
responsive to a temperature of the particulate filter exceeding a threshold, transitioning to operating in a second mode via the controller to regenerate the particulate filter, operating in the second mode including operating the engine loner than stoichiometry while injecting fuel into the exhaust passage via the exhaust fuel injector;
wherein the exhaust fuel injection is adjusted based on a degree of leanness of engine operation as determined via the controller.

16. The system of claim 15, wherein operating the engine leaner than stoichiometry in the second mode includes operating the engine with cylinder fueling deactivated via the controller when vehicle speed is lower than a threshold as determined via the controller, and operating the engine with cylinder fueling adjusted to be leaner than stoichiometry via the controller when the vehicle speed is higher than the threshold as determined via the controller.

17. The system of claim 15, wherein the controller includes further instructions for, while operating in the first mode, continually estimating an oxygen load of the exhaust catalyst via the controller, and responsive to the estimated oxygen load being higher than a threshold oxygen load as determined via the controller, reducing the air-fuel imbalance via the controller.

18. The system of claim 15, wherein the controller includes further instructions for, while operating in the second mode, operating the exhaust air pump via the controller responsive to the exhaust air-fuel ratio measured downstream of the particulate filter via the controller.

19. The system of claim 15, wherein operating the turbocharger via the electric motor includes adjusting an output of the electric motor to spin the intake compressor at a speed based on driver torque demand while the waste-gate valve is maintained fully open.

20. The system of claim 15, wherein the controller includes further instructions for operating in the first mode via the controller responsive to a particulate load being higher than a threshold particulate load at the particulate filter as determined via the controller, and for transitioning out of the second mode via the controller responsive to the particulate load being lower than the threshold particulate load at the particulate filter as determined via the controller.

* * * * *